(12) United States Patent
Yang et al.

(10) Patent No.: US 12,556,603 B2
(45) Date of Patent: Feb. 17, 2026

(54) APPLICATION SHARING METHOD AND SHARING APPARATUS

(71) Applicant: HUAWEI TECHNOLOGIES CO., LTD., Guangdong (CN)

(72) Inventors: Fan Yang, Shenzhen (CN); Ruokun Li, Shenzhen (CN); Shuifeng Yan, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 188 days.

(21) Appl. No.: 18/467,414

(22) Filed: Sep. 14, 2023

(65) Prior Publication Data

US 2023/0421636 A1 Dec. 28, 2023

Related U.S. Application Data

(63) Continuation of application No. PCT/CN2022/080001, filed on Mar. 9, 2022.

(30) Foreign Application Priority Data

Mar. 16, 2021 (CN) .......................... 202110278954.9

(51) Int. Cl.
*H04L 67/1095* (2022.01)

(52) U.S. Cl.
CPC .................. *H04L 67/1095* (2013.01)

(58) Field of Classification Search
None
See application file for complete search history.

(56) References Cited

U.S. PATENT DOCUMENTS

| 11,044,279 | B1* | 6/2021 | Benkreira | ............ H04L 65/1069 |
| 11,122,109 | B2* | 9/2021 | Sun | ...................... G06F 16/9558 |
| 2018/0091660 | A1* | 3/2018 | Lu | ....................... G06F 3/04817 |
| 2020/0264747 | A1* | 8/2020 | Tsukamoto | ........... G06F 40/143 |
| 2021/0258356 | A1* | 8/2021 | Benkreira | ............. H04L 67/125 |

FOREIGN PATENT DOCUMENTS

| CN | 105843649 A | 8/2016 |
| CN | 107885825 A | 4/2018 |
| CN | 104216905 B | 10/2018 |
| CN | 110020386 A | 7/2019 |
| CN | 111046312 A | 4/2020 |
| CN | 108228836 B | 2/2021 |
| WO | 2020007146 A1 | 1/2020 |

OTHER PUBLICATIONS

Alaga, "Leveraging Semantic Web Technologies to Enhance Individual and Collaborative Learning" Apr. 1, 2013, IEEE, 2013 Palestinian International Conference on Information and Communication Technology (pp. 1-7) (Year: 2013).*
Denis Ryabov et al:"Redefining Lazy Loading With Lazy Load XT." Smashing Magazine, Feb. 3, 2015, total 13 pages.
Android Development Manual, [online], https://developers.weixin.qq.com/doc/oplatform/Mobile_App/Share_and_Favorites/Android.html, Wechat official document, Oct. 16, 2024, total 10 pages.

* cited by examiner

*Primary Examiner* — Davoud A Zand

(57) ABSTRACT

A sharing method and sharing apparatus are provided. When running an application, a sharing party may receive a sharing instruction from a user, where the sharing instruction instructs the sharing party to share a page in the application. The sharing party shares page information with a shared party, and the shared party may obtain the page based on the page information.

12 Claims, 17 Drawing Sheets

APPLICATION SHARING METHOD AND SHARING APPARATUS

CROSS-REFERENCE TO RELATED APPLICATIONS

This application is a continuation of International Application No. PCT/CN2022/080001 filed on Mar. 9, 2022, which claims priority to Chinese Patent Application No. 202110278954.9 filed on Mar. 16, 2021. The disclosures of the aforementioned applications are hereby incorporated by reference in their entireties.

TECHNICAL FIELD

This disclosure relates to the field of information sharing, and in particular, to an application sharing method and sharing apparatus.

BACKGROUND

With rapid development of electronic information technologies and internet technologies, sharing an application on a terminal device by a user, for example, sharing a piece of good music on music software or sharing a commodity on shopping software, becomes an indispensable and popular part of life or work.

Therefore, how to implement application sharing becomes an urgent technical problem to be resolved.

SUMMARY

This disclosure provides an application sharing method and a related product. The technical solutions provided in this disclosure can implement application sharing.

According to a first aspect, this disclosure provides an application sharing method. The method is applied to a first device, and the method includes: running a first application; receiving a page sharing instruction, where the page sharing instruction instructs the first device to share a page in the first application; and sharing page information with a second device, where the page information is used to obtain the page.

In the technical solution of this disclosure, the first device implements application sharing by sending page information to the second device. The page information of the application is not limited by a transit application. To be specific, regardless pf which transit application is used by a terminal device to share the application with another terminal device, the another terminal device may output a page of the application based on the page information. Therefore, according to the method, when the terminal device shares the application by using the transit application, applets corresponding to different third-party applications do not need to be developed for the third-party applications to implement sharing of the application, thereby further reducing development costs and maintenance costs.

With reference to the first aspect, in a possible implementation, the sharing page information with a second device includes: sending the page information by using a second application.

With reference to the first aspect, in a possible implementation, the first device stores the page information in a page file; and the sharing page information with a second device includes: reading the page information from the page file, and sharing the page information with the second device.

In this technical solution, because the first device sends, to the second device, a page file that is of the to-be-shared page and that is directly and quickly obtained from the page file of the first application, quick sharing of the application can be implemented.

With reference to the first aspect, in a possible implementation, before the running a first application, the method further includes: downloading the first application through a network; and backing up the page file outside the first application.

In this technical solution, before the first application is run, the page file is also backed up outside the first application when the first application is downloaded through the network. Therefore, when the first device shares information with the second device, the page information that needs to be shared may be directly extracted from the backed-up page file and sent to the second device, and the information that needs to be sent does not need to be obtained from the first application, thereby implementing quick sharing.

With reference to the first aspect, in a possible implementation, the page information includes page element information and a page resource of the page.

With reference to the first aspect, in a possible implementation, the page information is an identifier corresponding to the page, and the sharing page information with a second device includes: sending the identifier to the second device, where the identifier is used to download page element information and a page resource of the page through a network.

In this technical solution, the first device sends the identifier corresponding to the page to the second device to implement page sharing. After receiving the identifier corresponding to the page, the second device may download, through the network, the page element information and the page resource that correspond to the identifier.

With reference to the first aspect, in a possible implementation, the identifier includes a first sub-identifier and a second sub-identifier, the first sub-identifier indicates the first application, and the second sub-identifier indicates the page.

With reference to the first aspect, in a possible implementation, the page element information and the page resource of the page are used to provide a first-part function of the page; and the method further includes: providing an ability file for the second device, where the ability file is used to provide a second-part function of the page.

In this technical solution, the first device may further provide a file other than the page information for the second device, so that more functions can be implemented when the page information shared to the second device is run, thereby improving a sharing effect.

According to a second aspect, this disclosure provides an application sharing method. The method is applied to a second device, and the method includes: obtaining page information shared by a first device, where the page information is used to generate a page of a first application; and obtaining and displaying the page based on the page information.

In the technical solution of this disclosure, the second device may obtain and display the page based on the page information shared by the first device.

With reference to the second aspect, in a possible implementation, the obtaining page information shared by a first device includes: receiving the page information by using a second application.

With reference to the second aspect, in a possible implementation, the page information includes page element information and a page resource of the page.

With reference to the second aspect, in a possible implementation, the page information is an identifier corresponding to the page; and the obtaining the page includes: downloading page element information and a page resource of the page through a network based on the identifier; and generating the page based on the page element information and the page resource of the page.

In this technical solution, a shared party may first obtain the page element information and the page resource based on the identifier such as character string information, and then generate the page. When downloading the page element information and the page resource of the page through the network, the second device may not download the entire application from an application market, but only download a file that includes the page element information and the page resource described by the character string information, thereby reducing a size of information downloaded by the shared party and reducing download time of the shared party.

With reference to the second aspect, in a possible implementation, the identifier includes a first sub-identifier and a second sub-identifier, the first sub-identifier indicates the first application, and the second sub-identifier indicates the page.

With reference to the second aspect, in a possible implementation, the page element information and the page resource of the page are used to provide a first-part function of the page; and the method further includes: obtaining an ability file from the first device, where the ability file is used to provide a second-part function of the page.

According to a third aspect, this disclosure provides a first device for sharing an application. The first device includes: a memory, configured to store program instructions; a processor, configured to invoke the program instructions to perform the following operations: running a first application, and receiving a page sharing instruction, where the page sharing instruction instructs the first device to share a page in the first application; and a communication module, configured to share page information with a second device, where the page information is used to obtain the page.

With reference to the third aspect, in a possible implementation, the communication module is specifically configured to send the page information by using a second application.

With reference to the third aspect, in a possible implementation, the first device stores the page information in a page file; and the communication module is further configured to: read the page information from the page file, and share the page information with the second device.

With reference to the third aspect, in a possible implementation, the communication module is further configured to: before a runtime module runs the first application, download the first application through a network; and the processor is further configured to invoke the program instructions to perform the following operation: backing up the page file outside the application.

With reference to the third aspect, in a possible implementation, the page information includes page element information and a page resource of the page.

With reference to the third aspect, in a possible implementation, the page information is an identifier corresponding to the page, and the communication module is further configured to send the identifier to the second device, where the identifier is used to download page element information and a page resource of the page through a network.

With reference to the third aspect, in a possible implementation, the identifier includes a first sub-identifier and a second sub-identifier, the first sub-identifier indicates the first application, and the second sub-identifier indicates the page.

With reference to the third aspect, in a possible implementation, the page element information and the page resource of the page are used to provide a first-part function of the page; and the communication module is further configured to provide an ability file for the second device, where the ability file is used to provide a second-part function of the page.

According to a fourth aspect, this disclosure provides an application sharing apparatus. The apparatus is applied to a second device, and the apparatus includes: a communication module, configured to obtain page information shared by a first device, where the page information is used to obtain a page of a first application; a memory, configured to store program instructions; and a processor, configured to invoke the program instructions to perform the following operations: obtaining and displaying the page based on the page information.

With reference to the fourth aspect, in a possible implementation, the communication module is specifically configured to receive the page information by using a second application.

With reference to the fourth aspect, in a possible implementation, the page information includes page element information and a page resource of the page.

With reference to the fourth aspect, in a possible implementation, the page information is an identifier corresponding to the page; and the obtaining the page includes: downloading page element information and a page resource of the page through a network based on the identifier; and generating the page based on the page element information and the page resource.

With reference to the fourth aspect, in a possible implementation, the identifier includes a first sub-identifier and a second sub-identifier, the first sub-identifier indicates the first application, and the second sub-identifier indicates the page.

With reference to the fourth aspect, in a possible implementation, the page element information and the page resource of the page are used to provide a first-part function of the page; and the communication module is further configured to obtain an ability file from the first device, where the ability file is used to provide a second-part function of the page.

According to a fifth aspect, this disclosure provides a computer-readable medium. The computer-readable medium stores program code to be executed by a device, and the program code includes the application sharing method according to any one of the foregoing aspects or the possible implementations.

According to a sixth aspect, this disclosure provides a computer program product including instructions. The computer program product includes computer program code, and when the computer program code is run on a computer, the computer is enabled to perform the application sharing method according to any one of the foregoing aspects or the possible implementations.

DESCRIPTION OF EMBODIMENTS

Figure 1:
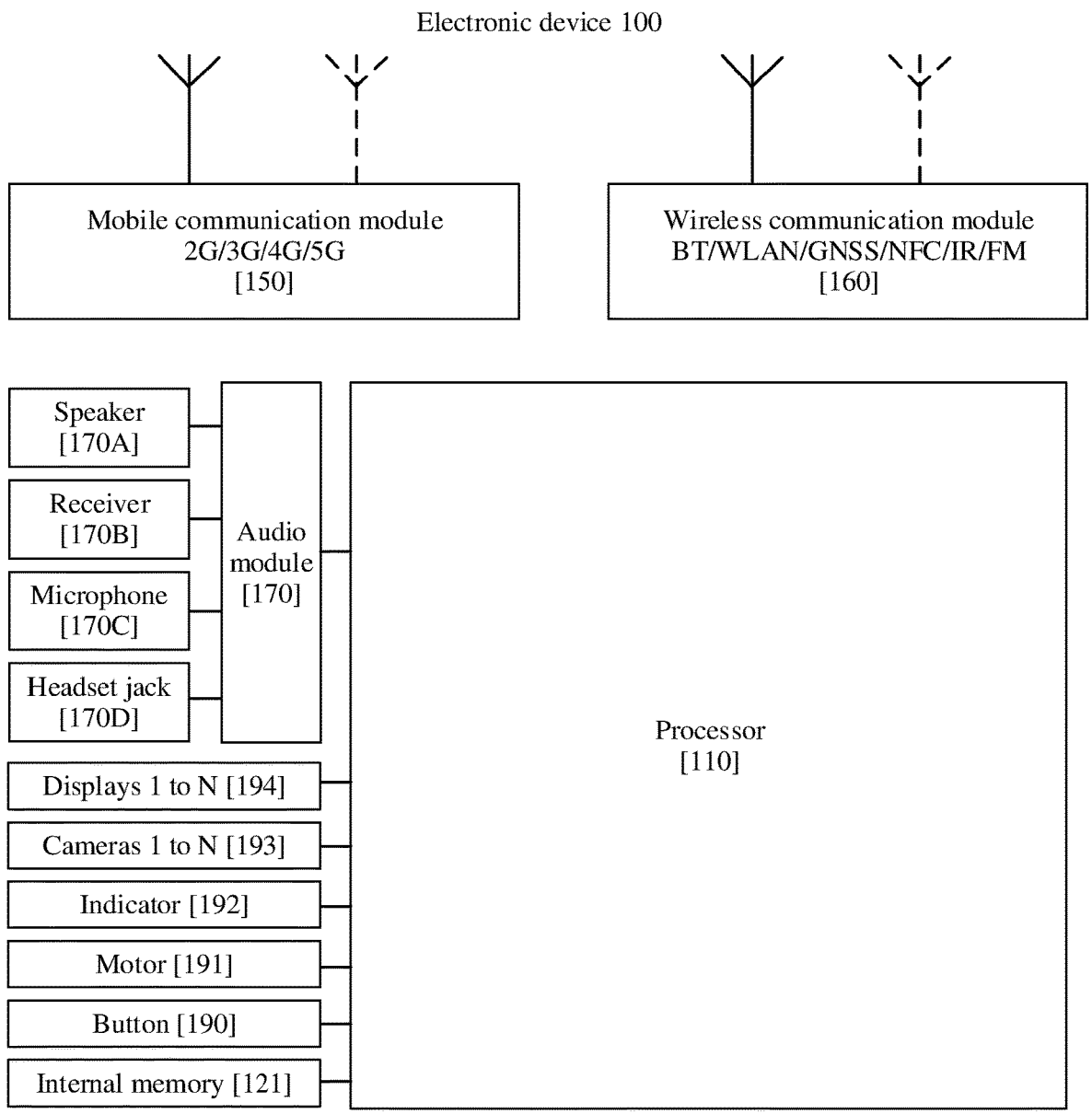
FIG. 1 is a schematic diagram of a hardware architecture of an electronic device according to an embodiment of this disclosure.

To better describe embodiments of this disclosure, the following first describes a sharing party and a shared party. In the disclosed embodiments, when a device shares an application with another device, the device is referred to as a sharing party, and the another device is referred to as a shared party.

Currently, to implement sharing of an application (APP), a developer of the application needs to develop an applet corresponding to the application. For example, to enable the sharing party to share a shopping application with the shared party through an application WeChat®, a developer needs to develop a WeChat® applet corresponding to the shopping application. After receiving shared content through WeChat®, the shared party needs to run the corresponding applet to open the received shared content.

This application sharing method requires additional development of the applet, and therefore increases work costs and maintenance costs of the developer.

Another manner for implementing application sharing is as follows: The sharing party generates a link related to shared content and sends the link to the shared party. When the shared party does not have an application that can open the link, the shared party needs to download, from an application market, and install the application corresponding to the link, and then open the shared content based on the link.

In this sharing manner, a size of an application package of the application downloaded by the shared party from the application market is usually large, resulting in long download time and a large traffic requirement.

Based on the technical problems in the existing application sharing methods, this application provides a new sharing solution. An application in this application may also be referred to as application software.

In the technical solutions provided in this application, the sharing party may share page information with the shared party, and the shared party may obtain a page based on the page information. Specifically, application sharing may be implemented in the following two manners.

In a first manner, the page information may be page element information and a page resource. The page element information may include one or more of the following information: page element and layout definitions, a page element color, a page element size, and dynamic status information of a page element. The page resource is a resource (for example, an image resource or a music resource) that needs to be displayed in an application. The sharing party extracts page element information and a page resource of a to-be-shared page in the application, and sends a page file including the page element information and the page resource to the shared party. The shared party may directly generate the page based on the page element information and the page resource. For example, the shared party runs the page element information and the page resource of the to-be-shared page in the page file through a runtime module, to implement all or some of functions of the to-be-shared page.

In the second manner, the page information may alternatively be an identifier related to the to-be-shared page. The sharing party generates and shares the identifier with the shared party. The shared party may first obtain the page element information and the page resource based on the identifier, and then generate the page. For example, after obtaining the identifier, the shared party downloads, based on the identifier, a file including the page element information and the page resource of the to-be-shared page from an application market or a server storing an application, and then runs the page element information and the page resource of the to-be-shared page in the page file through a runtime module, to implement all or some of functions of the to-be-shared page.

In the technical solutions provided in this disclosure, compared with that in the sharing manner in which an applet needs to be developed, a developer does not need to develop a corresponding applet, thereby reducing development costs and maintenance costs of the developer; and compared with the shared party downloading the shared application from the application market based on character string information, the shared party only needs to download the file including the page element information and the page resource of the to-be-shared page, and does not need to download the entire application, thereby reducing download time and traffic of the shared party.

In the second manner, the identifier related to the to-be-shared page may be the character string information. The sharing party may directly send the character string information to the shared party. The sharing party may alternatively generate a two-dimensional code carrying the character string information, and send or display the two-dimensional code to the shared party. A specific form of the identifier is not limited in this disclosure.

Further, the character string information in the technical solution of this disclosure may include identification information indicating the application and identification information indicating the to-be-shared page. For example, if page elements and page resources of a plurality of pages are stored in a same page file, the identification information indicating the to-be-shared page may include the page element information of the to-be-shared page and a position of the page resource in the page file. If a page element and a page resource of each page are separately stored in a page file, the identification information indicating the to-be-shared page may include the page element information of the to-be-shared page and a position of the page file in which the page resource is located in a page file library formed by a plurality of page files. The identification information indicating the application may include a name of the application, a download path of the application in the application market, and/or an address of the server storing the application, and the like.

After obtaining the character string information, the shared party may request, from the application market or the server storing the application, the page element information and the page resource that correspond to the character string information. After receiving the request, the application market may obtain, from the server of the application based on the character string information, the page element information and the page resource that correspond to the character string information, and then send the page element information and the page resource to the shared party.

Optionally, in the technical solutions provided in this disclosure, when sending the page information of the to-be-shared page in the application, the sharing party may further send permission verification information, to verify permission of the page information, so as to prevent a sharing risk caused by malicious tampering of the page information. In an example, the permission verification information may include signature information of the page information.

The application sharing method provided in this application may be applied to an electronic device. For example, FIG. 1 is a schematic diagram of a structure of an electronic device.

As shown in FIG. 1, the electronic device 100 may include at least one of a mobile phone, a foldable electronic device, a tablet computer, a desktop computer, a laptop computer, a handheld computer, a notebook computer, an ultra-mobile personal computer (UMPC), a netbook, a cellular phone, a personal digital assistant (PDA), an augmented reality (AR) device, a virtual reality (VR) device, an artificial intelligence (AI) device, a wearable device, a vehicle-mounted device, a smart home device, or a smart city device. A specific type of the electronic device 100 is not particularly limited in embodiments of this disclosure.

The electronic device 100 may include a processor 110, an internal memory 121, an antenna 1, an antenna 2, a mobile communication module 150, a wireless communication module 160, a display 194, an audio module 170, a speaker 170A, a receiver 170B, a microphone 170C, a headset jack 170D, and a button 190.

It may be understood that the structure shown in this embodiment does not constitute a specific limitation on the electronic device 100. In some other embodiments, the electronic device 100 may include more or fewer components than those shown in the figure, or some components may be combined, or some components may be split, or there may be a different component layout. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, a neural-network processing unit (NPU), and/or the like. Different processing units may be independent components, or may be integrated into one or more processors.

The processor may generate an operation control signal based on an instruction operation code and a time sequence signal to complete control of instruction fetching and instruction execution.

A memory may be further disposed in the processor 110, and is configured to store instructions and data. In some embodiments, the memory in the processor 110 may be a cache. The memory may store instructions or data just used or frequently used by the processor 110. If the processor 110 needs to use the instructions or the data, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like. The processor 110 may be connected to modules such as a touch sensor, an audio module, a wireless communication module, a display, and a camera by using at least one of the interfaces.

It may be understood that an interface connection relationship between the modules shown in this embodiment of this application is merely an example for description, and does not constitute a limitation on the structure of the electronic device 100. In some other embodiments of this application, the electronic device 100 may alternatively use an interface connection manner different from that in the foregoing embodiment, or use a combination of a plurality of interface connection manners.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be further multiplexed to improve antenna utilization. For example, the antenna 1 may be multiplexed as a diversity antenna in a wireless local area network. In some other embodiments, an antenna may be used in combination with a tuning switch.

The mobile communication module 150 may provide a solution that is applied to the electronic device 100 and that includes wireless communication technologies such as 2G, 3G, 4G, and 5G. The mobile communication module 150 may include a filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit a processed electromagnetic wave to the modem processor for demodulation. The mobile communication module 150 may further amplify a signal modulated by the modem processor, and convert an amplified signal into an electromagnetic wave for radiation through the antenna 1. In some embodiments, at least some function modules of the mobile communication module 150 may be disposed in the processor 110. In some embodiments, at least some function modules of the mobile communication module 150 and at least some modules of the processor 110 may be disposed in a same device.

The modem processor may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal. Then, the demodulator transfers the low-frequency baseband signal obtained through demodulation to the baseband processor for processing. The low-frequency baseband signal is processed by the baseband processor and then transmitted to the application processor. The application processor outputs a sound signal through an audio device (which is not limited to the speaker, the receiver 170B, or the like), or displays an image or a video through the display. In some embodiments, the modem processor may be an independent component. In some other embodiments, the modem processor may be independent of the processor 110, and is disposed in a same component as the mobile communication module 150 or another functional module.

The wireless communication module 160 may provide a wireless communication solution that includes a wireless local area network (WLAN) (for example, a wireless fidelity (Wi-Fi) network), Bluetooth (BT), Bluetooth low energy (BLE), an ultra-wideband (UWB), a global navigation satellite system (GNSS), frequency modulation (FM), a near field communication (NFC) technology, an infrared (IR) technology, or the like and that is applied to the electronic device 100. The wireless communication module 160 may be one or more components integrating at least one communication processing module. The wireless communication module 160 receives an electromagnetic wave through the antenna 2, performs frequency modulation and filtering processing on the electromagnetic wave signal, and sends a processed signal to the processor 110. The wireless communication module 160 may further receive a to-be-sent signal from the processor 110, perform frequency modulation and amplification on the signal, and convert a processed signal into an electromagnetic wave for radiation through the antenna 2.

In some embodiments, in the electronic device 100, the antenna 1 and the mobile communication module 150 are coupled, and the antenna 2 and the wireless communication module 160 are coupled, so that the electronic device 100 can communicate with a network and another electronic device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The electronic device 100 may implement a display function by using the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs that execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the electronic device 100 may include one or more displays 194.

The internal memory 121 may be configured to store computer-executable program code. The executable program code includes instructions. The internal memory 121 may include a program storage area and a data storage area. The program storage area may store an operating system, an application required by at least one function (for example, a sound playing function or an image playing function), and the like. The data storage area may store data (for example, audio data, a phone book, and the like) created in a process of using the electronic device 100, and the like. In addition, the internal memory 121 may include a high-speed random access memory, and may further include a non-volatile memory, for example, at least one magnetic disk storage device, a flash storage device, or a universal flash storage (UFS). The processor 110 runs the instructions stored in the internal memory 121 and/or the instructions stored in the memory disposed in the processor, to perform various function methods of the electronic device 100 or data processing.

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to encode and decode an audio signal. In some embodiments, the audio module 170 may be disposed in the processor 110, or some functional modules in the audio module 170 are disposed in the processor 110.

The speaker 170A, also referred to as a "loudspeaker", is configured to convert an audio electrical signal into a sound signal. The electronic device 100 may be configured to listen to music or output an audio signal of a hands-free call by using the speaker 170A.

The receiver 170B, also referred to as an "earpiece", is configured to convert an electrical audio signal into a sound signal. When a call is answered or voice information is received through the electronic device 100, the receiver 170B may be put close to a human ear to listen to a voice.

The microphone 170C, also referred to as a "mike" or a "mic", is configured to convert a sound signal into an electrical signal. When making a call or sending voice information, the user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, so as to implement a directional recording function and the like.

The headset jack 170D is configured to connect to a wired headset. The headset jack 170D may be a USB interface 130 or a 3.5 mm open mobile terminal platform (OMTP) standard interface or cellular telecommunications industry association of the USA (CTIA) standard interface.

The button 190 may include a power button, a volume button, and the like. The button 190 may be a mechanical button or a touch button. The electronic device 100 may receive a button input, and generate a button signal input related to a user setting and function control of the electronic device 100.

It may be understood that the structure shown in this embodiment of this application does not constitute a specific limitation on the electronic device 100. In some other embodiments of this application, the electronic device 100 may include more or fewer components than those shown in the figure, or some components may be combined, or some components may be split, or there may be a different component layout. The components shown in the figure may be implemented by hardware, software, or a combination of software and hardware.

When the electronic device 100 in this embodiment serves as a sharing party, the processor 110 may obtain page element information and a page resource of a to-be-shared page in an application from the internal memory 121, and the mobile communication module 150 or the wireless communication module 160 sends the page element information and the page resource. Optionally, the processor 110 may obtain, from the internal memory 121, page identification information (for example, character string information) used to describe the page, and the mobile communication module 150 or the wireless communication module 160 sends the page identification information. Optionally, the processor 110 obtains page identification information (for example, character string information) from the internal memory 121, generates a two-dimensional code carrying the page identification information, and controls the mobile communication module 150 or the wireless communication module 160 to send the two-dimensional code, or controls the display screen to display the two-dimensional code.

Optionally, the electronic device 100 serving as the sharing party may download an installation package of the application from an application market by using the mobile communication module 150 or the wireless communication module 160, obtain a page file of the application from the installation package, copy the page file to obtain a copy of the page file, and separately store the copy and the application, that is, separately back up the page file, so that page information in the page file can be quickly shared subsequently.

In addition, optionally, the electronic device 100 serving as the sharing party may download an installation package (including a page file) of the application and a copy of the page file from an application market by using the mobile communication module 150 or the wireless communication module 160. The processor 110 separately archives the copy of the page file in the internal memory 121, that is, separately stores the copy and the application. For example, the electronic device 100 stores a page copy in a separately archived page file library.

When the electronic device 100 in this embodiment serves as a shared party, the mobile communication module 150 or the wireless communication module 160 receives page element information and a page resource of a to-be-shared page in an application, and the processor 110 runs the page element information and the page resource by using a runtime module, to implement sharing of the application.

In this embodiment, optionally, when sending page information, a sharing party may further send permission verification information, to perform permission verification, so as to prevent a sharing risk caused by malicious tampering.

The electronic device 100 in this embodiment of this application may use an Android (Android) system, a HarmonyOS system, an iOS system, or another operating system, or may use a multi-framework operating system (for example, an Android system and a HarmonyOS system). This is not limited in this disclosure. In addition, a software system of the electronic device 100 may use a layered architecture, an event-driven architecture, a microcore architecture, a microservice architecture, or a cloud architecture. In an embodiment of this disclosure, a software system with a layered architecture is used as an example to describe the software structure of the electronic device 100.

In the layered architecture, software is divided into several layers, and each layer has a clear role and task. The layers communicate with each other through a software interface. In some embodiments, the software system of the electronic device is divided into five layers: an application layer, an application framework layer, a runtime (RT) and native C/C++ library, a hardware abstract layer (HAL), and a kernel layer from top to bottom.

Figure 2:
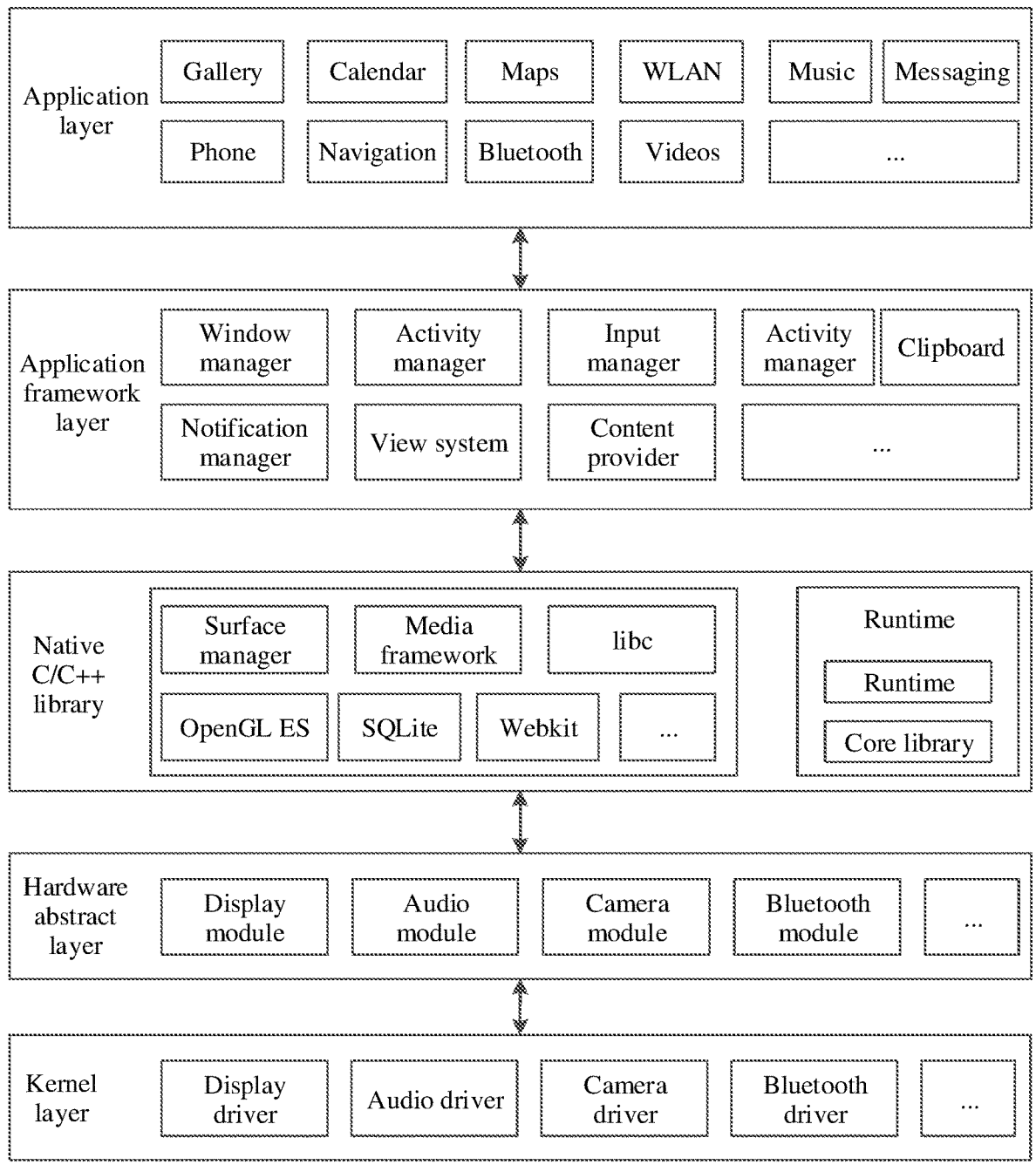
FIG. 2 is a schematic diagram of a software structure of an electronic device according to an embodiment of this disclosure.

The application layer may include a series of application packages. As shown in FIG. 2, the application packages may include applications such as Camera, Gallery, Calendar, Phone, Maps, Navigation, WLAN, Bluetooth, Music, Videos, and Messaging.

The application framework layer provides an application programming interface (API) and a programming framework for an application at the application layer. The application framework layer includes some predefined functions.

As shown in FIG. 2, the application framework layer may include a window manager, a content provider, a view system, a resource manager, a notification manager, an activity manager, a clipboard, an input manager, and the like.

The window manager provides a window manager service (WMS), and the WMS may be used for window management, window animation management, surface management, and as a transit station of an input system.

The content provider is configured to: store and obtain data, and enable the data to be accessed by an application. The data may include a video, an image, an audio, calls that are made and answered, a browsing history and bookmarks, an address book, and the like.

The view system includes visual controls such as a control for displaying a text and a control for displaying an image. The view system may be used to construct an application. A display interface may include one or more views. For example, a display interface including a notification icon of Messages may include a text display view and a picture display view.

The resource manager provides various resources such as a localized string, an icon, an image, a layout file, and a video file for an application.

The notification manager enables an application to display notification information in a status bar, and may be configured to convey a notification message. The notification manager may automatically disappear after a short pause without requiring a user interaction. For example, the notification manager is configured to notify download completion, provide a message notification, and the like. The notification manager may alternatively be a notification that appears in a top status bar of the system in a form of a graph or a scroll bar text, for example, a notification of an application running on the background or a notification that appears on a screen in a form of a dialog window. For example, text information is displayed in the status bar, an announcement is given, the electronic device vibrates, or the indicator light blinks.

The activity manager may provide an activity manager service (AMS), and the AMS may be used to start, switch, and schedule system components (such as activities, services, content providers, and broadcast receivers), and manage and schedule application processes.

The input manager may provide an input manager service (IMS), and the IMS may be used to manage a system input, for example, a touchscreen input, a key input, and a sensor input. The IMS obtains an event from an input device node, and allocates the event to an appropriate window by interacting with the WMS.

A runtime module is a running environment for an object-oriented programming language. Code written in any language requires a corresponding runtime module to run on hardware. In other words, if a program needs to run on hardware or a platform, an intermediate layer is required to convert or interpret a program language into a machine language that can be recognized by a machine. The intermediate layer may be understood as a runtime module.

The runtime module usually includes a corresponding engine as an interpreter, and the engine provides platform abilities such as a network, a process, and a file system of an operating system for the runtime module.

The runtime module in this embodiment may include a core library and a feature ability (FA) runtime module. The FA runtime module may convert source code into a user interface. For example, the FA runtime module in this embodiment may include a JavaScript (JS) engine, and the JS engine may run a program file written in a JavaScript language. The program file written in the JavaScript language is an example of a JS assets file in this embodiment.

The core library is mainly configured to provide basic Java-class libraries, such as a basic data structure, mathematics, I/O, a tool, a database, and a network. The core library provides an API for a user to develop an application.

The native C/C++ library may include a plurality of functional modules, for example, a surface manager (surface manager), a media framework, libc, OpenGL ES, SQLite, and Webkit.

The surface manager is configured to manage a display subsystem, and provide fusion of 2D and 3D layers for a plurality of applications. The media framework supports playing and recording of a plurality of commonly used audio and video formats, static image files, and the like. The media library may support a plurality of audio and video coding formats such as MPEG-4, H.264, MP3, AAC, AMR, JPG, and PNG. The OpenGL ES draws and operates 2D and 3D graphics in an application. The SQLite provides a lightweight relational database for an application of the electronic device 100.

The hardware abstract layer runs in user space, encapsulates a kernel layer driver, and provides a calling interface for an upper layer.

The kernel layer is a layer between hardware and software. The kernel layer includes at least a display driver, a camera driver, an audio driver, and a sensor driver.

It may be understood that the software structure is merely an example software structure of the electronic device in embodiments of this application, and should not constitute a limitation on the electronic device in embodiments of this application. An electronic device including a runtime module that can directly run a page file to display a user interface shall fall within the protection scope of this application. In some implementations, when the engine included in the runtime module of the electronic device in this embodiment of this application performs garbage collection, the entire system is not suspended. For example, the engine included in the runtime module of the electronic device in this embodiment of this application may be a JS engine.

When serving as a sharing party, the electronic device 100 may invoke a communication module (for example, an antenna module or a Bluetooth module) and the like at the hardware abstract layer to send page element information and a page resource, or send page identification information (for example, character string information). Correspondingly, when the electronic device 100 in this embodiment serves as a shared party, the runtime module may be invoked to run page element information and a page resource, so as to implement sharing of an application.

Optionally, in this embodiment, the electronic device serving as the sharing party may further send permission verification information of a page file or permission verification information of character string information used to describe the page file, to prevent a sharing risk caused by malicious tampering.

For ease of understanding, in the following embodiments of this application, a mobile phone having the structures shown in FIG. 1 and FIG. 2 is used as an example to describe, with reference to the accompanying drawings, an application scenario of sharing an application provided in embodiments of this application.

FIG. 3(a) to FIG. 3(e) show a group of graphical user interfaces (graphical user interfaces, GUIs) of a mobile phone. FIG. 3(a) to FIG. 3(e) show an example of a procedure from sharing an application by a sharing party to opening the shared application by a shared party.

Figure 3A:
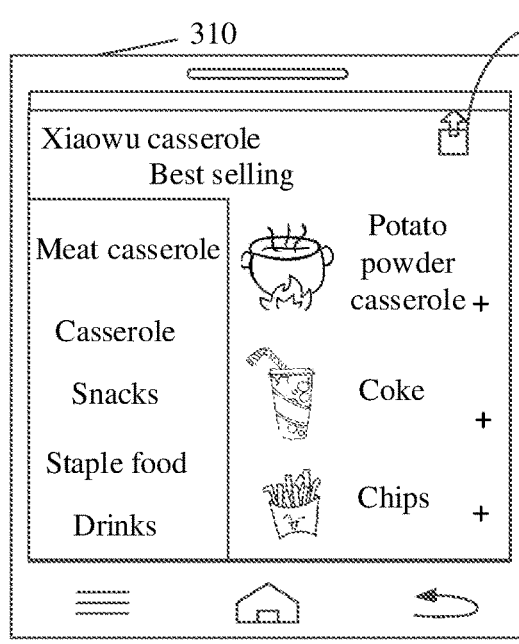
FIG. 3(*a*) to FIG. 3(*e*) are schematic diagrams of user interfaces for sharing an application according to a first embodiment of this disclosure.

As shown in FIG. 3(a), a user displays a page of a "Xiaowu casserole" store in a "Meituan takeout®" application on a mobile phone 310 that serves as a sharing party. The page includes a sharing icon 301.

Figure 3B:
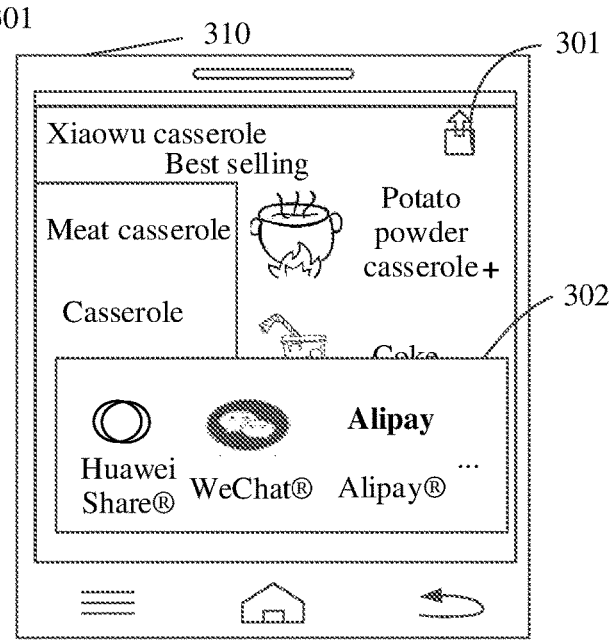

After the user taps the sharing icon 301, the mobile phone 310 may display a page shown in FIG. 3(b). In this embodiment, the page shown in FIG. 3(a) is a to-be-shared page.

The page shown in FIG. 3(b) includes a selection page 302 of a transit application. In other words, the user selects to share a transit application of the "Meituan takeout®" application. Examples of the transit application in this embodiment include "Huawei Share®", "WeChat®", "Alipay®", and the like.

Figure 3C:
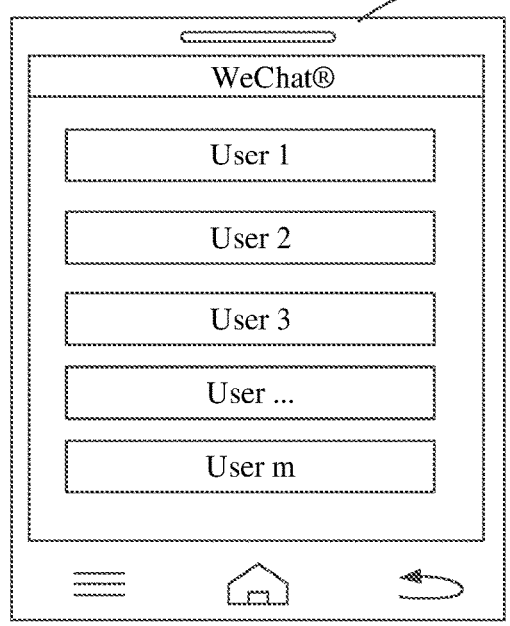

For example, after the user selects the "WeChat®" application shown in FIG. 3(b) as the transit application, the mobile phone 310 displays a page shown in FIG. 3(c). The page shown in FIG. 3(c) provides a selection of a shared user in the "WeChat®" application for the user. In other words, the user selects, from a user 1 to a user m, a user for sharing the "Meituan takeout®" application.

For example, after the user selects the user 1 on the page shown in FIG. 3(c), the mobile phone 310 sends a page file of the page shown in FIG. 3(a) in the "Meituan takeout®" application.

Figure 3D:
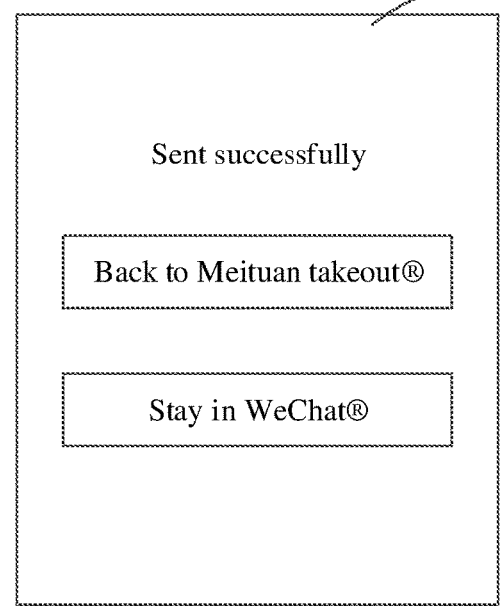

After sending the page file, the mobile phone 310 may go back to the page shown in FIG. 3(a), or may display a page shown in FIG. 3(d), or directly stay on a page of the "WeChat®" application. On the page shown in FIG. 3(d), the user selects whether to go back to the "Meituan takeout®" application or stay in the "WeChat®" application.

Figure 3E:
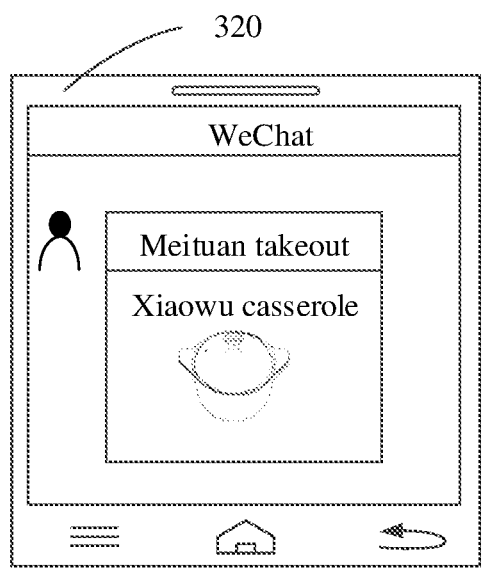

After receiving the page file of the "Meituan takeout®" application by using the "WeChat®" application, a mobile phone 320 that serves as a shared party may display a page shown in FIG. 3(e). As shown in FIG. 3(e), a page of an application 2 of the mobile phone 320 may include icons such as a name of the "Meituan takeout®" application and a name of the to-be-shared page (Xiaowu casserole).

After a user of the mobile phone 320 taps the "Xiaowu casserole" icon shown in FIG. 3(e), the mobile phone 320 may generate and display a page about "Xiaowu casserole". The page generated by the mobile phone 320 may be completely the same as the page in FIG. 3(a), or may include only a part of content of the page in FIG. 3(a). This is not limited in this application. In other words, the mobile phone 320 may implement some or all functions of the to-be-shared page based on received page information.

Figure 4A:
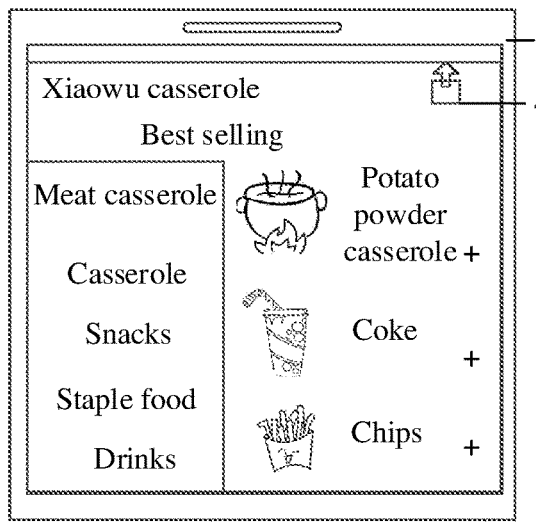
FIG. 4(*a*) to FIG. 4(*g*) are schematic diagrams of user interfaces for sharing an application according to a second embodiment of this disclosure.

FIG. 4(a) to FIG. 4(g) show a second group of graphical user interfaces of a mobile phone. As shown in FIG. 4(a), a user displays a page of a "Meituan takeout®" application on a mobile phone 410 that serves as a sharing party, where the page is a commodity display page of a "Xiaowu casserole" store, and the page includes a sharing icon 401.

Figure 4B:
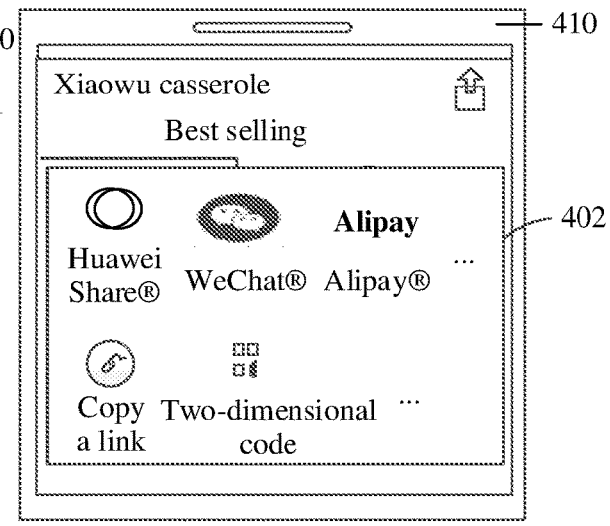

After the user taps the sharing icon 401, the mobile phone 410 may display a page shown in FIG. 4(b). The page shown in FIG. 4(b) includes a selection page 402 for providing a transit application for the user. To be specific, the user selects to share the "Meituan takeout®" application by using the transit application, or selects to share the "Meituan takeout®" application by "copying a link", or selects to share the "Meituan takeout®" application by "displaying a two-dimensional code". Examples of the transit application include "Huawei Share®", "WeChat®", "Alipay®", and the like.

Figure 4C:
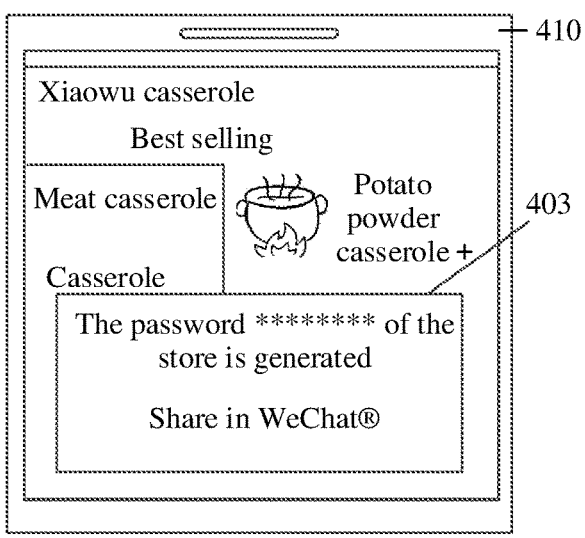

For example, after the user selects "WeChat®" shown in FIG. 4(b) as the transit application, the mobile phone 410 displays a page shown in FIG. 4(c). Prompt information 403 is displayed on the page shown in FIG. 4(c), to prompt the user to share a password, where the password includes character string information used to describe page element information and a page resource of the page shown in FIG. 4(a).

Figure 4D:
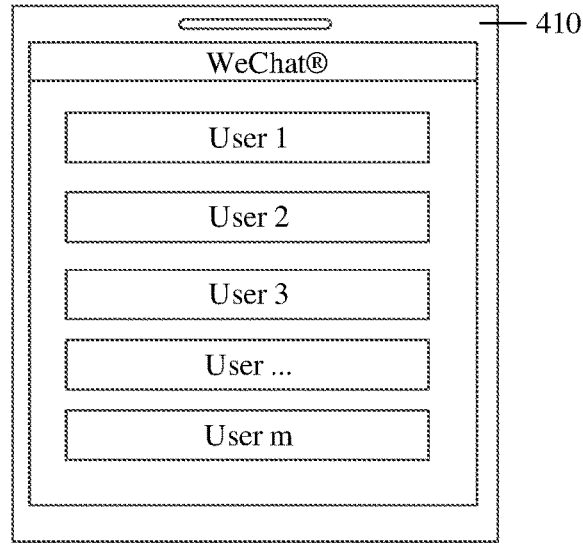
Figure 4E:
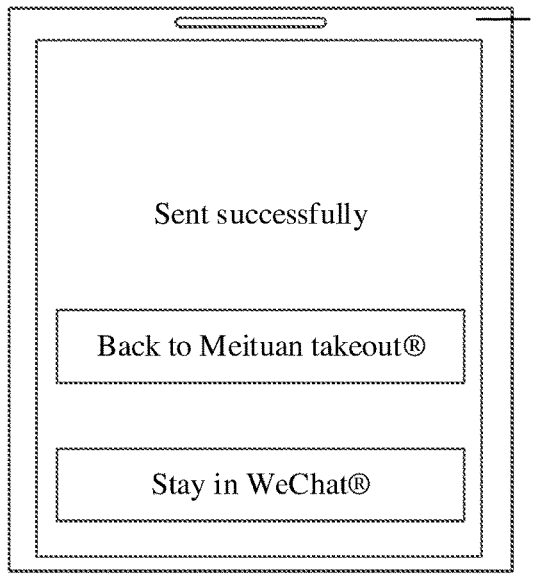

After the user confirms to share the password in the "WeChat®" application, the mobile phone 410 jumps to the "WeChat®" application, and displays a page shown in FIG. 4(d). The page shown in FIG. 4(d) provides a selection of a shared user in the "WeChat®" application for the user. In other words, the user selects, from a user 1 to a user m, a user for sharing the "Meituan takeout®" application.

For example, after the user selects the user 1 on the page shown in FIG. 4(d), the mobile phone 410 sends the password. After sending the password, the mobile phone 410 may go back to the page shown in FIG. 4(a), or may display a page shown in FIG. 4(e), or directly stay on a page of the "WeChat®" application. On the page shown in FIG. 4(e), the user selects whether to go back to the "Meituan takeout®" application or stay in the "WeChat®" application.

Figure 4F:
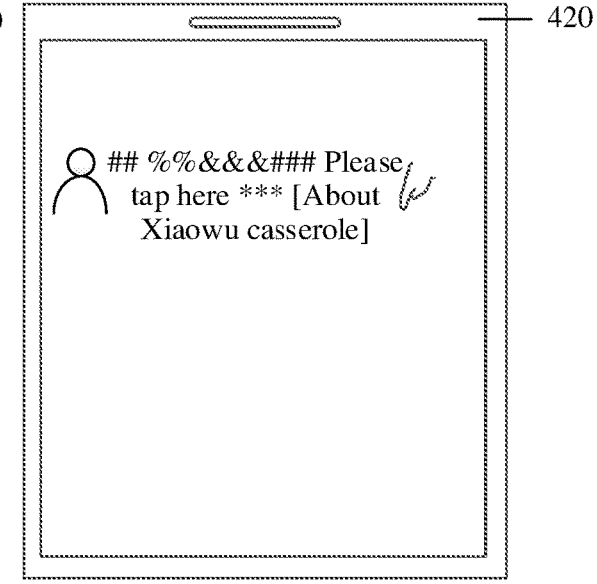
Figure 4G:
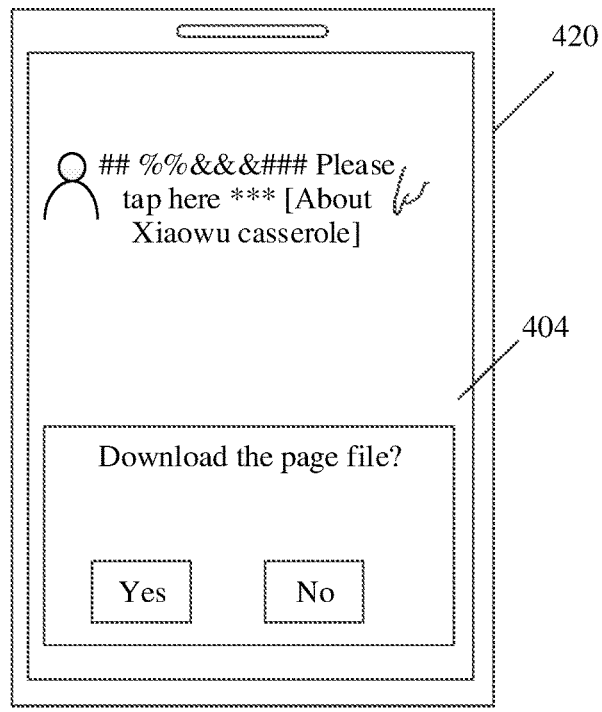

After receiving the password, a "WeChat®" application of a mobile phone 420 that serves as a shared party may display a page shown in FIG. 4(f), where the page includes content (for example, "Please tap here") that prompts the user for an operation that needs to be performed, and may further include some information (for example, "About Xiaowu casserole") of the shared page, so that a user of the mobile phone 420 learns a basic situation of the shared page. After the user of the mobile phone 420 copies the password (for example, presses and holds the password), the mobile phone 420 may display a page shown in FIG. 4(g). On the page shown in FIG. 4(g), prompt information 404 is output, so that the user determines whether to download a page file that includes the page element information and the page resource.

If the user selects to confirm the download, the mobile phone 420 may download, from an application market or a server of the "Meituan takeout®" application based on the password, the page file that includes the page element information and the page resource of the to-be-shared page.

After the mobile phone 420 downloads, from the application market, the page file that includes the page element information and the page resource of the to-be-shared page, and the user of the mobile phone 420 confirms to open the page file, the mobile phone 420 runs the downloaded page file, and displays the to-be-shared page.

It may be understood that, after the mobile phone 420 serving as the shared party downloads the page file from the application market, the mobile phone 420 may directly and actively run the received page file to display the to-be-shared page without being selected and confirmed by the user.

Optionally, the password in this embodiment may be replaced with a link used to download the to-be-shared page from a network or a two-dimensional code that carries character string information used to describe the page file of the to-be-shared page. In a scenario in which the password in this example is replaced with the corresponding link, after the mobile phone 420 receives and displays the link, the user may tap the link or copy the link to a browser to open the to-be-shared page. In a scenario in which the password is replaced with the corresponding two-dimensional code, after receiving and displaying the two-dimensional code, the mobile phone 420 may identify the two-dimensional code to obtain the character string information carried in the two-dimensional code, and download the page file from the network based on the character string information.

In this embodiment, optionally, the mobile phone 410 may not display a selection page of the transit application for the user. In this implementation, after the password, the link, or the two-dimensional code is generated, prompt information "The password is generated", "The link is generated", or "The two-dimensional code is generated" is output to the user. Then, the user inputs, to the mobile phone 410, an instruction for entering a desktop home page of the mobile phone 410, and selects, from the desktop home page, a transit application (for example, "Huawei Share®", "WeChat®", or "Alipay®") for sending the link, and performs corresponding operations in FIG. 4(d) to FIG. 4(g). In this embodiment, page element information and a page resource of an application are not limited by a transit application. In other words, regardless of which transit application is used by a terminal device to share a page of the application with another terminal device, the another terminal device may obtain the page of the application based on the page element information and the page resource. Therefore, in this implementation, a development system does not need to develop corresponding applets for different third-party applications to implement sharing of the application, thereby further reducing development costs and maintenance costs.

Figure 5:
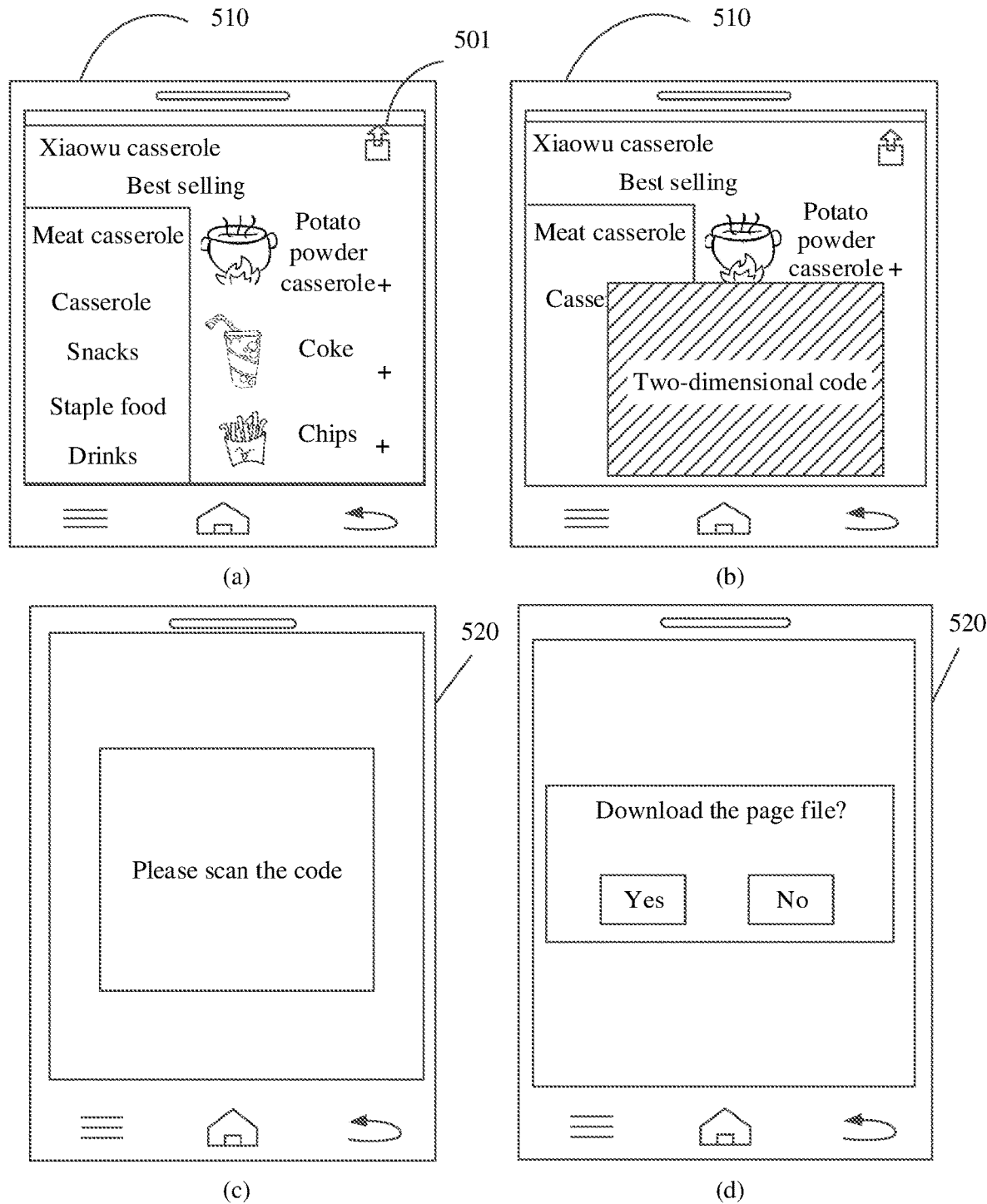
FIG. 5 is a schematic diagram of a user interface for sharing an application according to a third embodiment of this disclosure.

FIG. 5 shows a third group of graphical user interfaces of a mobile phone. Herein, (a) in FIG. 5 to (d) in FIG. 5 show a procedure from sharing an application by a sharing party to opening the shared application by a shared party.

As shown in (a) in FIG. 5, a user displays a to-be-shared page of a "Meituan takeout®" application on a mobile phone 510 that serves as a sharing party. The page includes a sharing icon 501.

After the user taps the sharing icon 501, as shown in (b) in FIG. 5, the mobile phone 510 generates a two-dimensional code and displays the two-dimensional code, where the two-dimensional code includes character string information used to describe a page file of the to-be-shared page.

When a user of a mobile phone 520 that serves as a shared party needs to open the to-be-shared page, the user may input an instruction to the mobile phone 520, to invoke a two-dimensional code scanning function of the mobile phone 520. After receiving the instruction that is input by the user and that is for invoking the two-dimensional code scanning function, the mobile phone 520 displays a page shown in (c) in FIG. 5, and outputs information "Please scan the code" that prompts the user to scan the two-dimensional code. After the user scans, by using the mobile phone 520, the two-dimensional code displayed on the mobile phone 510, a page shown in (d) in FIG. 5 may be displayed. On the page shown in (d) in FIG. 5, the user confirms whether to download the page file.

When the user confirms to download the page file, the user downloads the page file of the to-be-shared page from an application market or a server based on information in the two-dimensional code.

After downloading the page file from the application market, the mobile phone 520 may run the file to display the page shown in (a) in FIG. 5.

Figure 6:
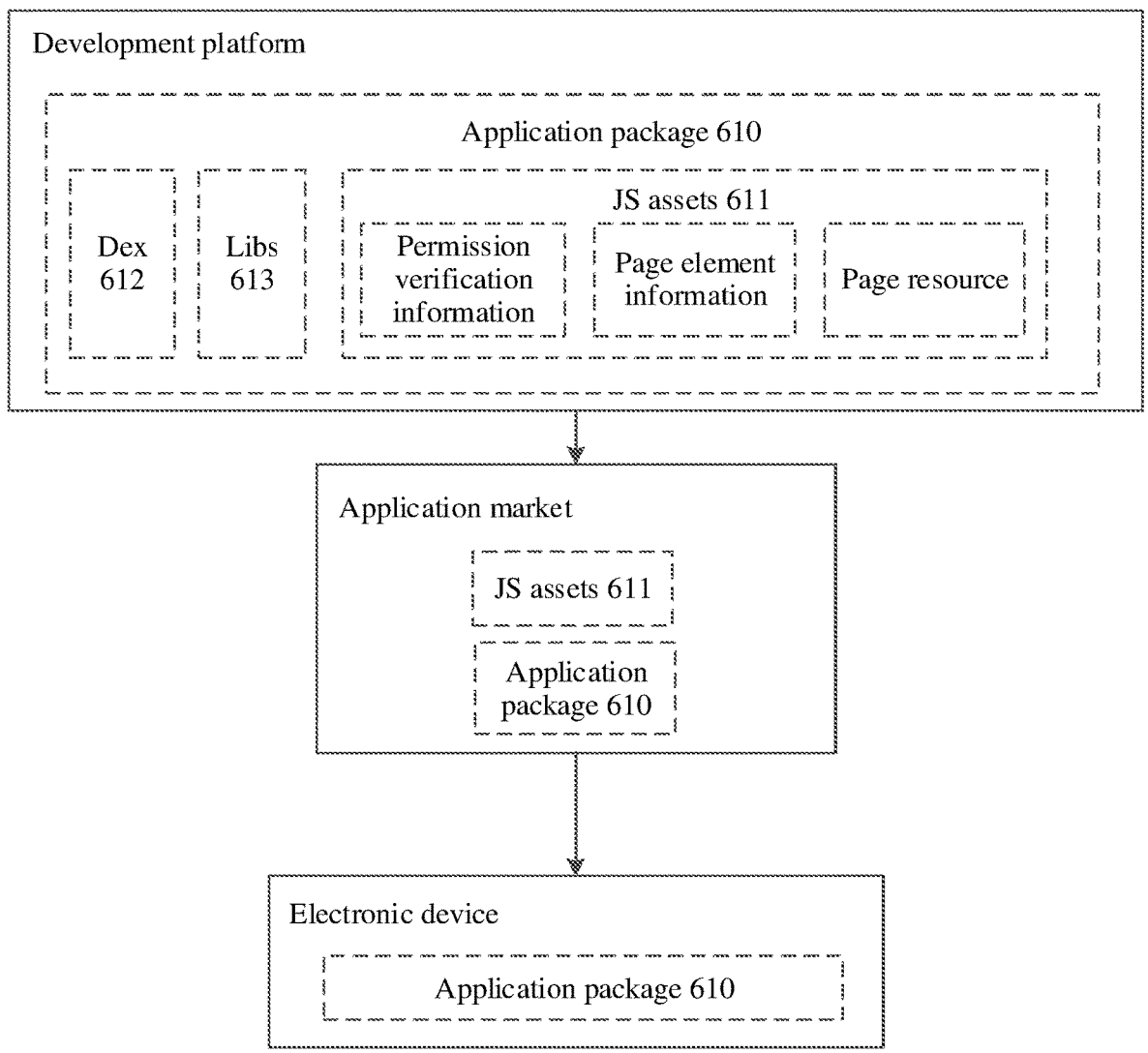
FIG. 6 is a schematic diagram of a file structure according to an embodiment of this disclosure.
Figure 7:
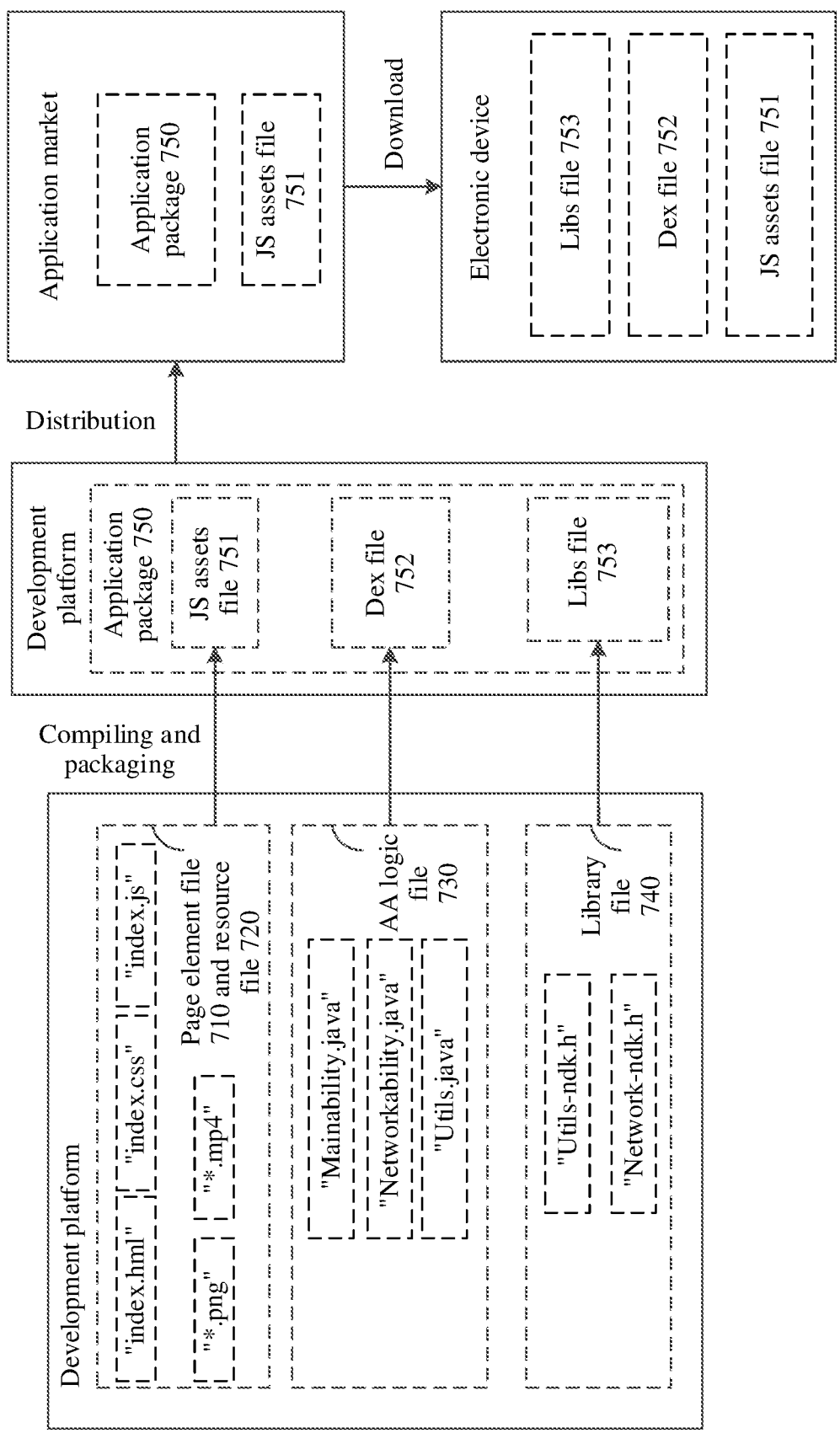
FIG. 7 is a schematic diagram of a file structure according to another embodiment of this disclosure.

To better describe the application sharing method in this application, the following describes procedures of packaging, distributing, and installing an application with reference to FIG. 6 and FIG. 7.

FIG. 6 is a schematic diagram of a file structure in a process of developing and packaging an application and installing the application on an electronic device according to an embodiment of this application.

As shown in FIG. 6, in a packaging process of the application, a developer may obtain an application package (APP Pack) 610 of the application through packaging by using an application development platform. The application package 610 may include: a JS assets file 611, indicating a page information file written in a JavaScript language in the application; a Dex file 612, which is a file obtained by packaging an information file used to describe an AA logic class, and is usually an executable file of an operating system of the electronic device; and a Libs file 613, which is a C++library file obtained by packaging a library file on which the application depends.

The JS assets file 611 may include page element information of each user interface and a page resource in each user interface in one or more user interfaces of the disclosure.

In this embodiment, page element information and page resources of different user interfaces may be separately stored in different files, or may be stored in one file. Regardless of a storage manner, the page element information and the resource of each user interface usually need to have a unique identifier. Both the page element information and the page resource may be referred to as page information. In this application, a file storing the page information is referred to as a page file.

It should be noted that in this embodiment of this disclosure, writing the page element information and the page resource in the JavaScript language is merely an example, and this is not limited in this application. Actually, the page element information and the page resource of the user interface may alternatively be written in another language, provided that a runtime module has an engine for parsing the language for writing the page element information and the page resource, and the runtime module can directly run the page element information and the page resource. Correspondingly, the page element information and the page resource that are written in another language may alternatively be separately archived as a file.

In this embodiment, an example of the application package 610 is a HarmonyOS ability package (HAP), and another example is an Android application package (APK). When the application package 610 is an HAP package, the page file may include one or more FA files. When a page needs to be shared, page element information and a page resource of the to-be-shared page may be sent to a shared party in a form of an FA file.

In this embodiment, after the application package is obtained, a development platform may release the application package 610 to the application market.

After receiving the application package 610 of the application, the application market stores the application package 610. Optionally, in addition to storing the application package 610, the application market may separately archive at least one JS assets file 611, that is, make an additional copy of the JS assets file 611 and separately store the copy and the application package 610, so that the page information is sent to the shared party when the application is subsequently shared, thereby implementing quick sharing.

After the application market archives the application package 610 and the JS assets file 611, the electronic device may download the application package 610 from the application market.

In an implementation of this embodiment, when the electronic device downloads the application from the application market, the application market may separately deliver the application package 610 of the application to the electronic device. In this implementation, after installing the application based on the application package 610, the electronic device may store the application package 610 of the application. Optionally, after installing the application based on the application package 610, the electronic device may separately archive at least one JS assets file 611 (not shown in the figure) outside the application package 610. It may be understood that the electronic device may separately store the separately archived JS assets file 611 in a default directory, or the user may select an installation directory in which the separately archived JS assets file 611 is stored. This is not limited in this embodiment of this disclosure.

In another implementation of this embodiment, when the electronic device downloads the application from the application market, the application market may send, to the electronic device, the application package 610 of the application and the JS assets file 611 separately archived in the application market. In this implementation, after installing the application, in addition to storing the application package 610, the electronic device may further separately archive the JS assets file 611 received from the application market.

In the method of this embodiment, optionally, the JS assets file 611 may further include permission verification information, and the permission verification information is used to perform permission verification on the page information sent when the electronic device shares the application. The permission verification may be verification performed on the page element information and the page resource, or may be verification performed on character string information.

When the JS assets file 611 includes the permission verification information, correspondingly, when sending the page information, an electronic device serving as a sharing party may further send the permission verification information. After receiving the page information, an electronic device serving as a shared party may first perform security verification based on the permission verification information, to prevent a sharing risk caused by malicious tampering of the page information, thereby improving sharing security.

FIG. 7 is a schematic diagram of a document structure in a process of developing, packaging, distributing, downloading, and installing an application according to another embodiment of this disclosure.

As shown in FIG. 7, an application file obtained through development includes a page element file 710, a resource file 720, an AA logic file 730, and a library file 740.

The page element file 710 refers to a file including page element information, and may include: "index.hml", used to describe page element and layout definitions of the application; "index.css", used to describe color and size definitions of a page element of the application; and "index.js", used to describe a dynamic status information definition of the page element of the application. In some implementations, the page element file may be binary data.

The resource file 720 refers to a file including a page resource, and may include "*.png", used to describe an image resource that needs to be displayed by the application. It may be understood that, that the resource file includes the image resource herein is merely an example. The resource file in this application may further include a resource file of another type. This is not limited in this embodiment of this application. For example, a resource file of music software may further include a "*.mp4" resource, where the resource is used to describe a music resource that needs to be displayed in a local cache.

"index.html", "index.css", and "index.js" may be considered as layout information of a user interface corresponding to the page element file, and "*.png" may be considered as a resource class file of an image that needs to be displayed on the user interface.

The AA logic file 730 may include: "Mainability.java", indicating a general entry file of an AA ability class; "Networkability.java", indicating a file of a network AA ability class; and "Utils.java", which is an AA ability auxiliary class file, and provides abilities such as converting character string information into digital information. The AA logic file may be referred to as an AA file for short.

The library file 740 on which the application depends may include: "Utils-ndk.h", indicating a C++ library file on which "Utils.java" depends; and "Network-ndk.h", indicating a C++ library file on which "Networkability.java" depends.

After the files are compiled and packaged, an application package 750 may be obtained. The application package 750 includes a JS assets file 751, a Dex file 752, and a Libs file 753. The JS assets file 751 may be obtained by packaging the page element file 710 and the resource file 720, the Dex file 752 may be obtained by packaging the AA logic file 730, and the Libs file 753 may be obtained by packaging the library file 740.

After the application package 750 is obtained through packaging, the application package may be distributed to an application market. When the application market archives the application package 750, not only the application package 750 is archived, but also the JS assets file 751 may be separately archived.

When downloading the application from the application market, the electronic device may download the application package 750 of the application and the separately archived JS assets file 751, and store the JS assets file 751 and the application package 950 at different positions.

It should be noted herein that a type of an operating system of a terminal device is not limited in this embodiment of this application. When operating systems of terminal devices are different types of operating systems, names of files or modules with a same or similar function may be different.

For example, when an operating system of the electronic device is an Android system, the file that describes the page element and layout definitions of the application may include a file referred to as "activity main.xml"; the file that describes the color and size definitions of the page element of the application may include files referred to as "colors.xml", "dimens.xml", and "styles.xml"; the file that describes the dynamic status information definition of the page element of the application and/or a file that describes information about a logic class may include a file referred to as "MainActivity.java"; the file indicating the network ability class may include a file referred to as "Networkability.java"; the auxiliary class file providing the abilities such as converting the character string information into the digital information may include files referred to as "Utils.java" and "MessengerService.h"; and the library file on which the application depends may include a file referred to as "Utils-ndk.h" and/or a file referred to as "Network-ndk.h".

It may be understood that the processes from development to installation of the application shown in FIG. 6 and FIG. 7 are merely examples. For example, after obtaining the software package of the application through development by using a development system, a developer may not deliver the software package to the electronic device by using the application market, but directly send or copy the included application package (and the separately archived JS assets file) to the electronic device.

Based on the foregoing descriptions, in the following embodiments of this application, an electronic device having the structures shown in FIG. 1 and FIG. 2 is used as an example to describe in detail a system structure provided in this application with reference to FIG. 8 to FIG. 11.

Figure 8:
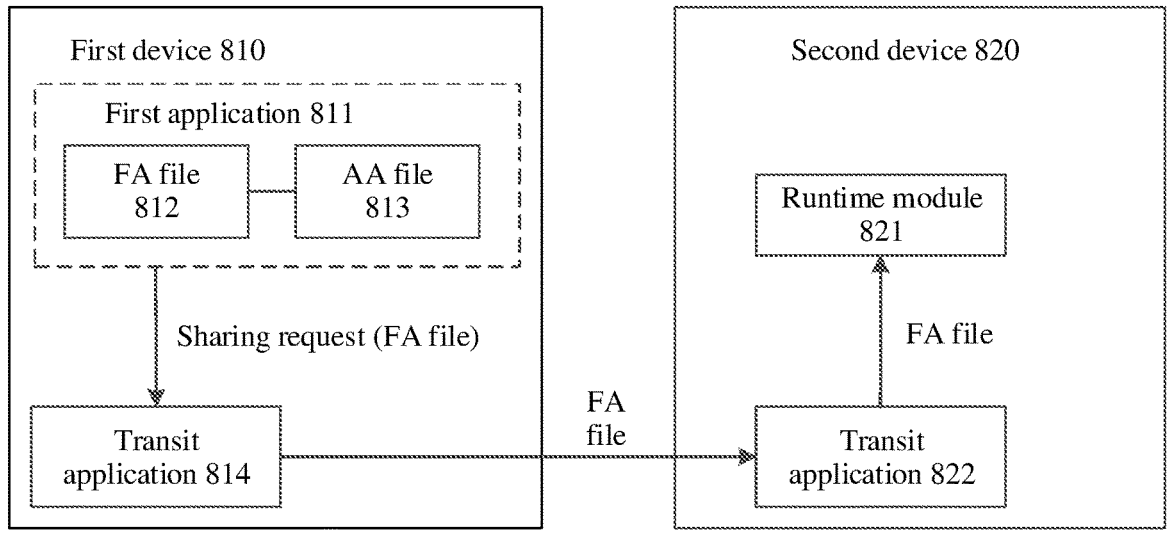
FIG. 8 is a schematic diagram of a system architecture according to an embodiment of this disclosure.

FIG. 8 is a schematic diagram of the system structure according to an embodiment of this application. As shown in FIG. 8, a device serving as a sharing party is referred to as a first device 810, and a device serving as a shared party is referred to as a second device 820. The first device 810 and/or the second device 820 are/is not limited to a terminal device, and may be a lightweight device, for example, may be a smart screen, a smartwatch, a virtual reality (VR) device, an augmented reality (AR) device, or a television.

As shown in FIG. 8, the first device 810 runs a first application 811 based on an FA file 812 and an AA file 813 of the first application 811. The first application 811 sends a sharing request to a transit application 814, where the sharing request carries an FA file including page element information and a page resource of a to-be-shared page. Examples of the transit application include "Huawei Share®", "WeChat®", a direct connection application between any devices, or the like. The direct connection application between devices may include Bluetooth, Wi-Fi, infrared, or the like. After receiving the sharing request of the first application, the transit application 814 sends the FA file. In a possible implementation, the FA file may include only the page element information and the page resource of the to-be-shared page in the first application 811.

After receiving the FA file, a transit application on the second device 820 runs the FA file by using a runtime module 821, to implement sharing of the first application.

Figure 9:
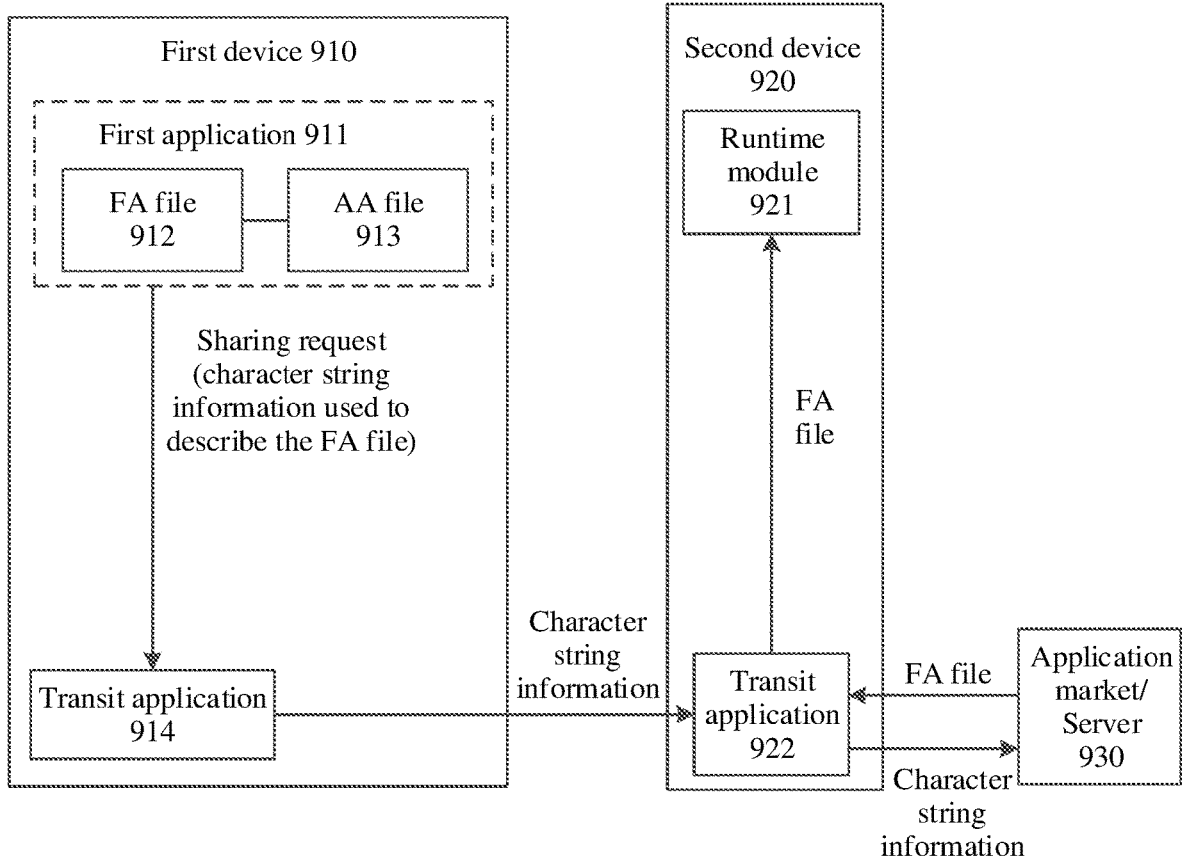
FIG. 9 is a schematic diagram of a system architecture according to another embodiment of this disclosure.

FIG. 9 is a schematic diagram of the system structure according to another embodiment of this application. As shown in FIG. 9, a first application 911 sends a sharing request to a transit application 914, and the transit application 914 sends character string information, where the character string information is used to describe an FA file including page element information and a page resource of a to-be-shared page. After receiving the character string information, a transit application 922 on a second device downloads the FA file from an application market or an application server 930 based on the character string information, and runs the FA file through a runtime module 921, to implement sharing of the first application 911. The FA file may include only the page element information and the page resource.

In this embodiment of this application, optionally, an FA file may have a corresponding AA file, or may not have a corresponding AA file. This is not limited in this embodiment of this application.

The FA file may be packaged and released independently. The FA file usually has one or more of the following abilities: installation-free, independent running without applications, cross-device UI migration, and cross-device binary migration.

The AA file is usually used to support running of the FA file. The AA file supports multi-end deployment and distributed execution, and depends only on a system service. AA files do not depend on each other.

In this embodiment, optionally, when the runtime module 921 of the second device 920 runs the FA file, a larger quantity of and more complex functions of the first application 911 may be implemented by sharing an AA file 913 on a first device 910.

Figure 10:
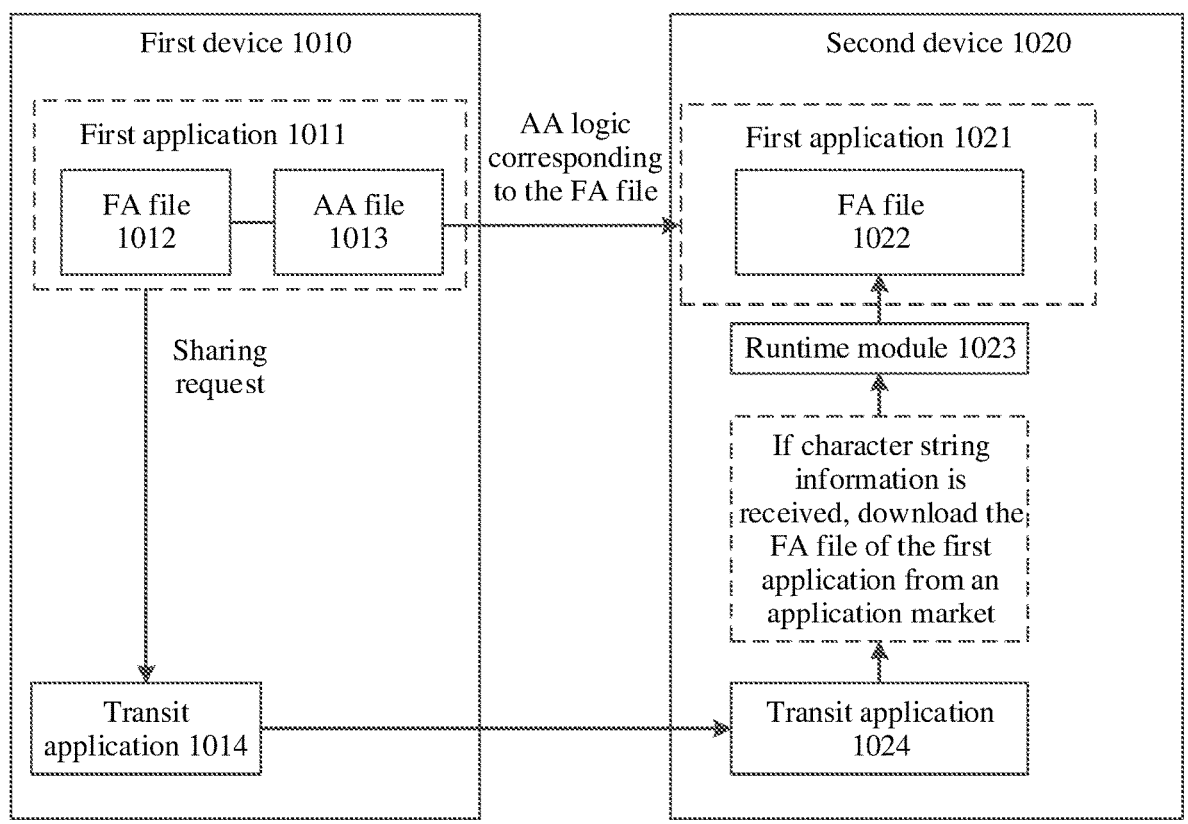
FIG. 10 is a schematic diagram of a system architecture according to another embodiment of this disclosure.

FIG. 10 shows an implementation in which a second device 1020 shares an AA file 1013 on a first device 1010. A runtime module 1021 of the second device 1020 runs an FA file, determines, based on a running result, that an AA file (which may be the AA file 1013 or a portion thereof) needs to be run for a function provided by a page corresponding to the FA file, and sends a request message to the first device 1010 to request the AA file used to implement the function. After receiving the request message of the second device 1020, the first device 1010 sends the corresponding AA file to the second device 1020. After receiving the AA file, the second device 1020 provides the corresponding function based on the AA file, to implement sharing of the another function on the to-be-shared page.

For example, when the to-be-shared page runs on the first device, some ability files (for example, a video file or an audio file) other than a page resource are run at the same time. These ability files are not required for running page information and usually occupy large storage space, and therefore are not used as a part of the page information. However, page element information and a page resource in the page information usually can implement only a part of functions of the to-be-shared page, and these ability files may provide another part of functions of the to-be-shared page, so that user experience can be improved. When a shared party expects that a generated to-be-shared page includes the functions implemented by the ability file, the shared party may obtain the ability file from a sharing party, and run the ability file when running the page information, so that the shared party can implement more functions of the to-be-shared page.

Figure 11:
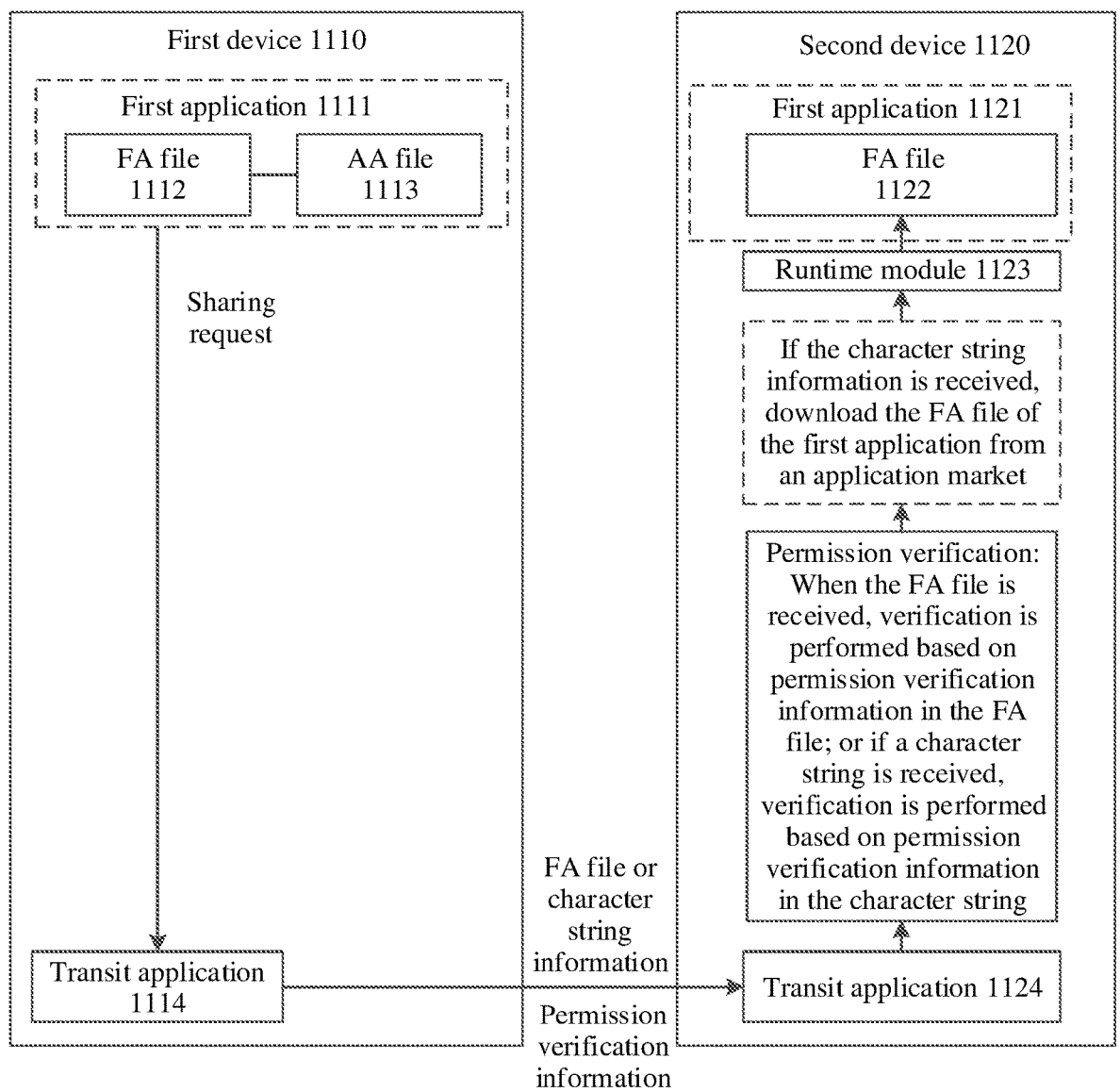
FIG. 11 is a schematic diagram of a system architecture according to another embodiment of this disclosure.

As shown in FIG. 11, a first device 1110 may further send permission verification information corresponding to an FA file or character string information to a second device 1120. If the second device 1120 receives the FA file and the permission verification information corresponding to the FA file, the second device performs permission verification on the FA file based on the permission verification information, and runs the FA file only when the permission verification succeeds. If the second device 1120 receives the character string information of the FA file and the permission verification information corresponding to the character string information, the second device performs permission verification on the character string information based on the permission verification information, and downloads the FA file from an application market only when the permission verification succeeds. In this way, a sharing risk caused by malicious tampering of the FA file or the character string information of the FA file can be prevented.

Optionally, the permission verification information may include information such as signature information and a package name of a first application. The signature information may be information obtained by the first device 1110 by signing the FA file or the character string information based on private key information that corresponds to the first application 1111 and that is obtained from a database. Correspondingly, the second device 1120 may verify the signature information based on public key information that is of a first application 1121 and that is obtained from the database. The database may be a distributed database.

Figure 12:
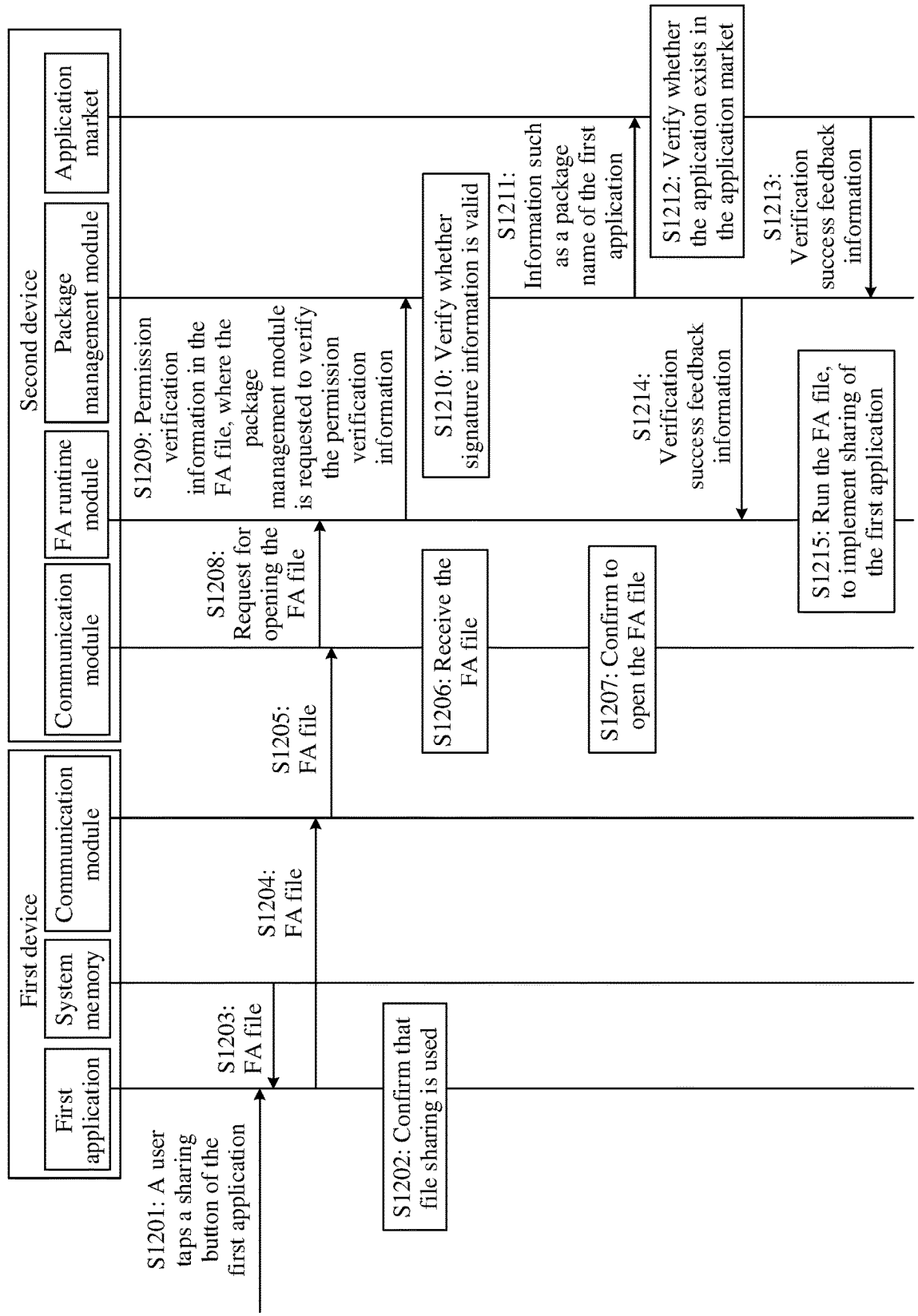
FIG. 12 is a schematic flowchart of an application sharing method according to an embodiment of this disclosure.

FIG. 12 is an interaction diagram of an application sharing method according to an embodiment of this application. As shown in FIG. 12, the sharing method in this embodiment of this application may include all or some steps of S1201 to S1215. In the method, S1201 to S1205 are performed by a sharing party, and S1206 to S1215 are performed by a shared party. In this embodiment, the sharing party is referred to as a first device, and the shared party is referred to as a second device.

S1201: A user taps a sharing button on a first page in a first application on the first device. For example, the user taps the sharing icon shown in FIG. 3(a).

S1202: The user confirms, on the first application of the first device, that file sharing is used.

S1203: The first application of the first device obtains an FA file and permission verification information of the FA file from a system memory of the first device, where the FA file includes page element information and a page resource of the first page.

S1204: The first application of the first device sends the FA file and the permission verification information corresponding to the FA file to a communication module of the first device.

S1205: The communication module of the first device sends the FA file and the corresponding permission verification information to the second device.

S1206: A communication module of the second device receives the FA file and the corresponding permission verification information.

S1207: The user confirms to the second device to open the FA file.

For example, after receiving the FA file by using the communication module, the second device displays the user interface shown in FIG. 3(e). The user taps content displayed in FIG. 3(e) to confirm to open the FA file.

S1208: After the user determines to open the FA file, the communication module of the second device sends a request for opening the FA file to a runtime module, and sends the FA file and the corresponding permission verification information to the runtime module.

S1209: The runtime module of the second device sends the permission verification information of the FA file to a package management module of the second device, to request the package management module to verify the permission verification information.

In an example, the permission verification information may include a package name, a class name, and signature information of the first application.

S1210: The package management module of the second device verifies whether the signature information is valid. The package management module of the second device provides abilities of installing, uninstalling, and querying a resource package.

S1211: When verifying that the signature information is valid, the package management module of the second device sends information such as the package name of the first application to an "AppGallery" application of the second device.

S1212: The "AppGallery" application of the second device verifies whether the first application exists in an application market.

S1213: When the first application exists in the application market, the application market program of the second device sends verification success feedback information to the package management module.

S1214: After receiving the feedback information of the application market program, the package management module of the second device sends verification success feedback information to the runtime module.

S1215: After receiving the feedback information of the package management module, the runtime module of the second device runs the FA file, to implement sharing of the first page.

In step S1212, verifying the first application by using the application market is merely an example. Actually, the first application may alternatively be verified by using a website storing the first application, for example, an official website corresponding to the first application. A specific manner of verifying the first application is not limited in this application.

Figure 13A:
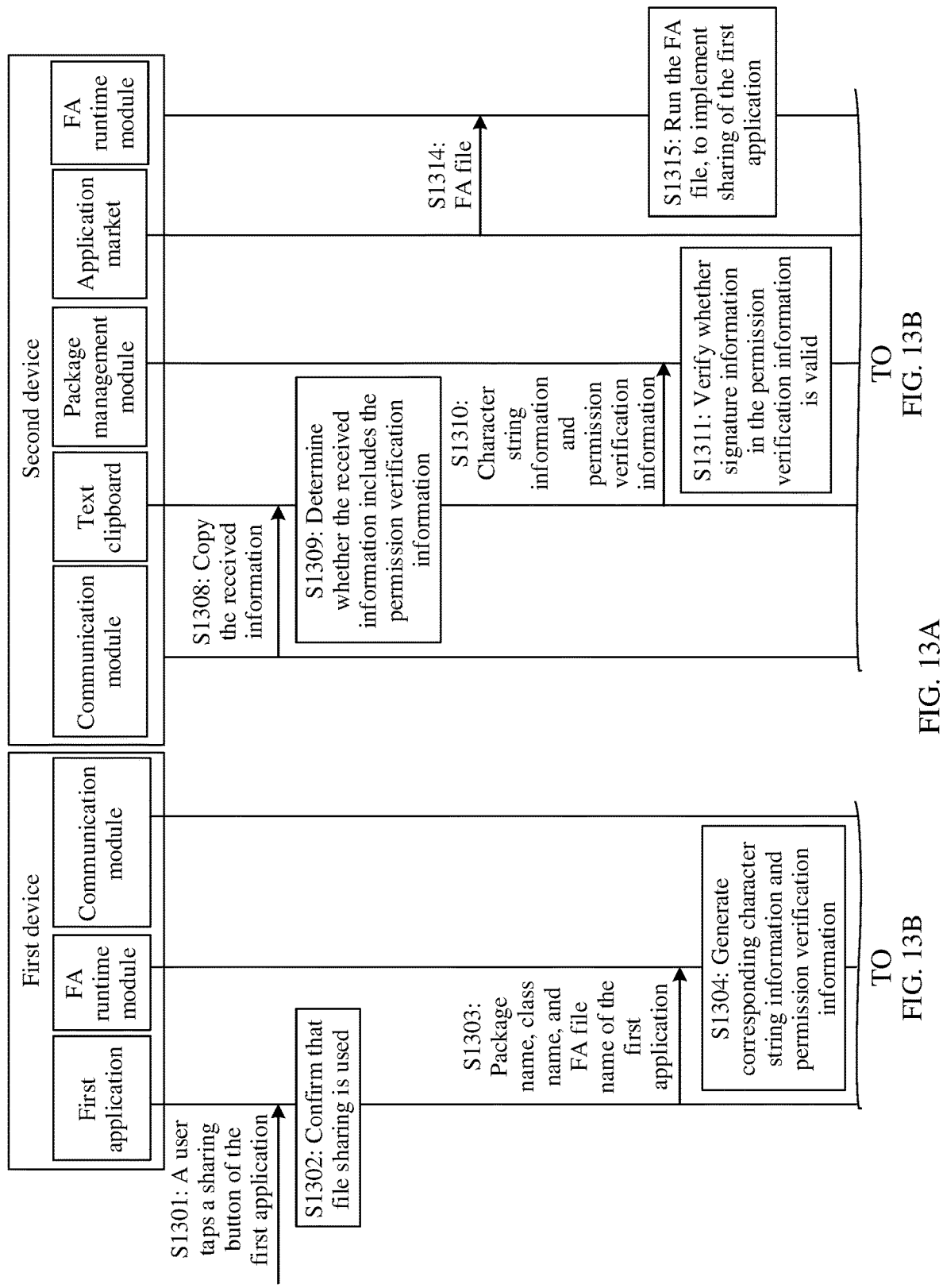
FIG. 13A and FIG. 13B are a schematic flowchart of an application sharing method according to another embodiment of this disclosure.
Figure 13B:
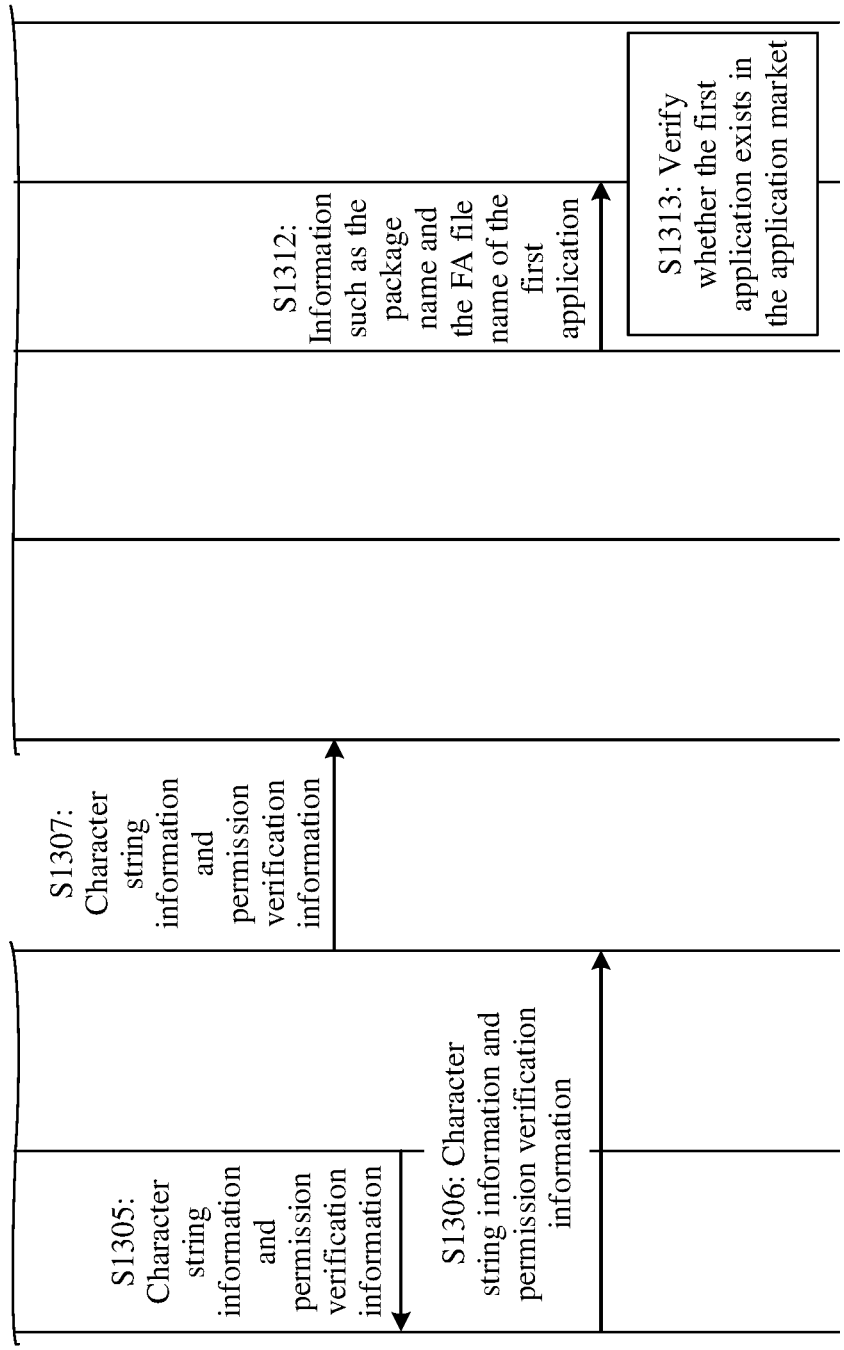

FIG. 13A and FIG. 13B are an interaction diagram of an application sharing method according to another embodiment of this application. As shown in FIG. 13A and FIG. 13B, the sharing method in this embodiment of this application may include all or some steps of S1301 to S1315. In the method, S1301 to S1307 are performed by a sharing party, and S1308 to S1315 are performed by a shared party. In this embodiment, the sharing party is referred to as a first device, and the shared party is referred to as a second device.

S1301: A user taps a sharing button on a first page in a first application on the first device. For example, the user taps the sharing icon shown in FIG. 4(a).

S1302: The user confirms, on the first application of the first device, that character string information sharing is used.

S1303: The first application of the first device sends a package name, a class name, and an FA file name of the first application to a runtime module of the first device, where the FA file name includes an identifier of the first page.

S1304: The runtime module of the first device generates character string information and permission verification information based on the FA file name.

S1305: The runtime module of the first device returns the character string information and the permission verification information of the character string information to the first application.

S1306: The first application of the first device sends the character string information and the permission verification information corresponding to the character string information to a communication module of the first device.

S1307: The communication module of the first device sends the character string information and the permission verification information to the second device. Correspondingly, a communication module of the second device receives the character string information and the permission verification information.

S1308: The communication module of the second device copies the received information to a text clipboard of the second device.

For example, after receiving a FA file by using the communication module, the second device displays the user interface shown in FIG. 4(f), where the user interface includes the character string information. The user presses and holds the character string information in FIG. 4(f) to request to copy the character string information.

S1309: The text clipboard module of the second device determines whether the received information includes the permission verification information. In an example, the permission verification information may include the package name, the class name, and signature information of the first application.

S1310: When determining that the received information includes the permission verification information, the text clipboard of the second device sends the character string information and the permission verification information to a package management module.

S1311: The package management module of the second device verifies whether the signature information in the permission verification information is valid. The package management module of the second device provides abilities of installing, uninstalling, and querying a resource package.

S1312: When verifying that the signature information is valid, the package management module of the second device sends information such as the package name and the FA file name of the first application to an application market program of the second device.

S1313: The "AppGallery" application of the second device verifies whether the first application exists in an application market.

S1314: When the first application exists in the application market, the "AppGallery" application of the second device downloads the FA file from the application market, and sends the FA file to the runtime module of the second device.

S1315: The runtime module of the second device runs the FA file, to implement sharing of the first application.

Figure 14A:
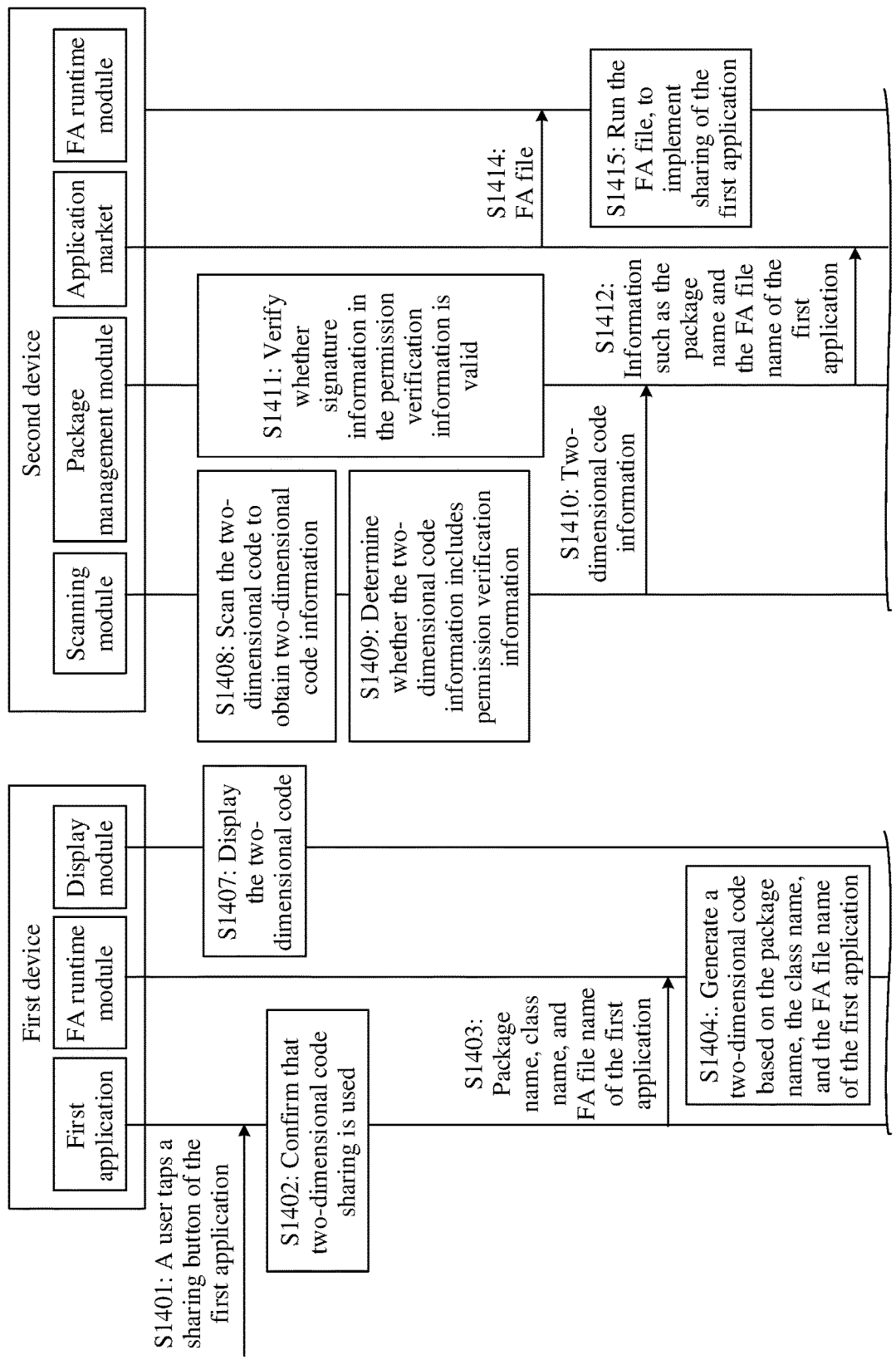
FIG. 14A and FIG. 14B are a schematic flowchart of an application sharing method according to another embodiment of this disclosure.
Figure 14B:
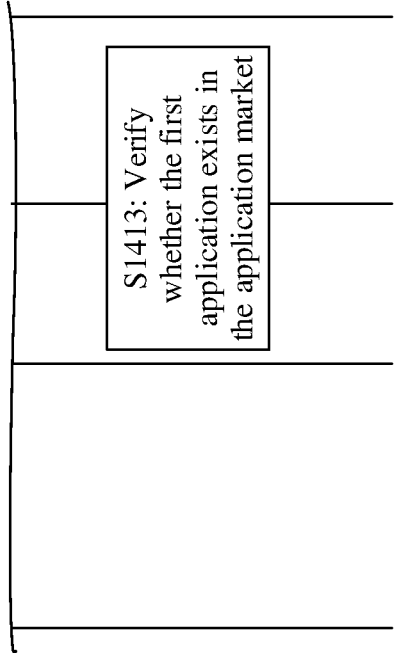
Figure 14B:
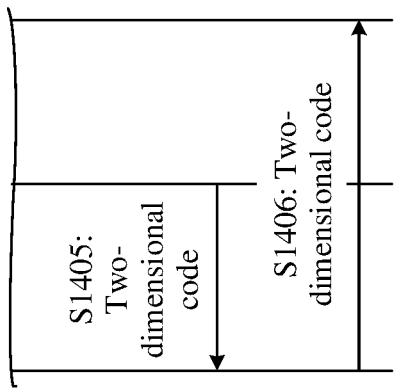

FIG. 14A and FIG. 14B are an interaction diagram of an application sharing method according to another embodiment of this application. As shown in FIG. 14A and FIG. 14B, the sharing method in this embodiment of this application may include all or some steps of S1401 to S1415. In the method, S1401 to S1407 are performed by a sharing party, and S1408 to S1415 are performed by a shared party. In this embodiment, the sharing party is referred to as a first device, and the shared party is referred to as a second device.

S1401: A user taps a sharing button on a first page in a first application on the first device.

S1402: The user confirms, on the first application of the first device, that two-dimensional code sharing is used.

S1403: The first application of the first device sends a package name, a class name, and an FA file name of the first application to a runtime module of the first device, where the FA file name includes an identifier of the first page.

S1404: The runtime module of the first device generates character string information and permission verification information based on the package name, the class name, and the FA file name of the first application, and generates a two-dimensional code based on the character string information and the permission verification information.

S1405: The runtime module of the first device returns the two-dimensional code to the first application.

S1406: The first application of the first device sends the two-dimensional code to a display module of the first device.

S1407: The display module of the first device displays the two-dimensional code.

S1408: A scanning module of the second device scans the two-dimensional code to obtain two-dimensional code information.

S1409: The scanning module of the second device determines whether the two-dimensional code information includes the permission verification information. In an example, the permission verification information may include the package name, the class name, and signature information of the first application.

S1410: When verifying that the two-dimensional code information includes the permission verification information, the scanning module of the second device sends the two-dimensional code information to a package management module.

S1411: The package management module of the second device verifies whether the signature information in the permission verification information is valid. The package management module of the second device provides abilities of installing, uninstalling, and querying a resource package.

S1412: When verifying that the signature information is valid, the package management module of the second device sends information such as the package name and the FA file name of the first application to an "AppGallery" application of the second device.

S1413: The "AppGallery" application of the second device verifies whether the first application exists in an application market.

S1414: When the first application exists in the application market, the "AppGallery" application of the second device downloads the FA file from the application market, and sends the FA file to the runtime module of the second device.

S1415: The runtime module of the second device runs a FA file, to implement sharing of the first application.

It may be understood that, to implement the functions, the first device and the second device include corresponding hardware and/or software modules for performing the functions. With reference to algorithm steps of each example described in embodiments disclosed in this specification, this application can be implemented in a form of hardware or a combination of hardware and computer software.

Whether a function is performed by hardware or hardware driven by computer software depends on particular applications and design constraints of the technical solutions. A person skilled in the art may use different methods to implement the described functions for each particular application with reference to embodiments, but it should not be considered that the implementation goes beyond the scope of this application.

In this embodiment, the electronic device may be divided into function modules based on the examples in the foregoing methods. For example, each function module corresponding to each function may be obtained through division, or two or more functions may be integrated into one module. The integrated module may be implemented in a form of hardware, or may be implemented in a form of software. It should be noted that the module division in this embodiment is an example, and is merely a logical function division. During actual implementation, another division manner may be used.

It should be noted that all related content of the steps in the foregoing method embodiments may be cited in function descriptions of corresponding function modules. Details are not described herein again.

The electronic device provided in this embodiment is configured to perform the method performed by the first device or the sharing party in the foregoing method embodiments, or is configured to perform the method performed by the second device or the shared party in the method embodiments, and therefore can achieve same effect as the implementation methods.

When an integrated unit is used, the electronic device may include a processing module, a storage module, and a communication module. The processing module may be configured to control and manage an action of the electronic device. The storage module may be configured to support the electronic device to store program code, data, and the like. The communication module may be configured to support communication between the electronic device and another device, for example, obtaining page information of a to-be-shared page and sending the page information to the another device or receiving page information from the another device. The communication module may further support the electronic device in downloading data through a network, for example, downloading an application from a server. The storage module may be a memory, and the memory may store program code. The processing module may be a processor or a controller. The processor or the controller may invoke the program code to implement or execute various example logical blocks, modules, and circuits described with reference to content disclosed in this application. The processor may alternatively be a combination, for example, a combination including one or more microprocessors or a combination of digital signal processor (DSP) and a microprocessor, for implementing a computing function. The communication module may be specifically a device, for example, a radio frequency circuit, a Bluetooth chip, or a Wi-Fi chip, that interacts with another electronic device.

In an embodiment, when the processing module is a processor and the storage module is a memory, the electronic device in this embodiment may be a device with the structure shown in FIG. 1.

An embodiment further provides a computer storage medium. The computer storage medium stores computer instructions. When the computer instructions are run on an electronic device, the electronic device is enabled to perform the related method steps, to implement the method in the foregoing embodiments.

An embodiment further provides a computer program product. When the computer program product runs on a computer, the computer is enabled to perform the related steps, to implement the method in the foregoing embodiments.

In addition, an embodiment of this application further provides an apparatus. The apparatus may be specifically a chip, a component, or a module. The apparatus may include a processor and a memory that are connected. The memory is configured to store computer-executable instructions. When the apparatus runs, the processor may execute the computer-executable instructions stored in the memory, to enable the chip to perform the methods in the foregoing method embodiments.

The electronic device, the computer storage medium, the computer program product, or the chip provided in embodiments is configured to perform the corresponding method provided above. Therefore, for beneficial effect that can be achieved, refer to the beneficial effect of the corresponding method provided above. Details are not described herein again.

The foregoing descriptions about implementations allow a person skilled in the art to understand that, for convenient and brief description, division of the foregoing function modules is taken as an example for illustration. In actual application, the foregoing functions can be allocated to different modules and implemented based on a requirement, that is, an inner structure of an apparatus is divided into different function modules to implement all or some of the functions described above.

In the several embodiments provided in this application, it should be understood that the disclosed apparatuses and methods may be implemented in another manner. For example, the described apparatus embodiment is merely an example. For example, the module or division into the units is merely logical function division and may be other division during actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate parts may or may not be physically separate, and parts displayed as units may be one or more physical units, may be located in one place, or may be distributed on different places. Some or all of the units may be selected based on an actual requirement to achieve objectives of the solutions of embodiments.

In addition, functional units in embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software function unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in the form of a software product. The software product is stored in a storage medium and includes several instructions for instructing a device (which may be a single-chip microcomputer, a chip, or the like) or a processor to perform all or some of the steps of the methods described in the embodiments of this application. The storage medium includes any medium that can store program code, for example, a USB flash drive, a removable hard disk, a read-only memory (ROM), a random access memory (RAM), a magnetic disk, or an optical disc.

The foregoing descriptions are merely specific implementations of this disclosure, but are not intended to limit the protection scope of this disclosure, which is set forth in the claims.

The invention claimed is:

1. An application sharing method applied to a first device, the method comprising:
   running an application;
   receiving a page sharing instruction including an instruction for the first device to share a page in the application; and
   sharing a page file of the page with a second device, wherein the page file includes one or more feature availability (FA) files, wherein a FA runtime module of the second device converts the one or more FA files into a user interface; or
   sharing an identifier corresponding to the page with a second device, wherein the second device downloads a page file through a network based on the identifier, wherein the page file includes one or more FA files and a feature ability FA runtime module of the second device converts the one or more FA files into a user interface.

2. The application sharing method according to claim 1, the method further comprising:
   downloading the application through a network; and
   backing up the page file outside of the application.

3. The application sharing method according to claim 1, wherein the identifier comprises a first sub-identifier and a second sub-identifier, the first sub-identifier indicating the application and the second sub-identifier indicating the page.

4. The application sharing method according to claim 1, further comprising:
   providing a first-part function of the page based on the page element information and the page resource of the page;
   providing an ability file for the second device; and
   providing a second-part function of the page based on the ability file.

5. An application sharing method applied to a second device, the method comprising:
   obtaining page information shared by a first device, wherein the page information is a page file of a page or an identifier corresponding to the page, wherein the second device downloads the page file of the page through a network based on the identifier, wherein the page file includes one or more feature availability (FA) files; and
   converting the one or more FA files into a user interface through a FA runtime module of the second device, wherein the page information is the page file of the page; or
   converting the one or more FA files into a user interface through a FA runtime module of the second device, wherein the page information is the identifier.

6. The application sharing method according to claim 5, wherein:
   the page information is an identifier corresponding to the page; and
   the obtaining and displaying the page based on the page information comprises:
      downloading page element information and a page resource of the page through a network based on the identifier; and
      generating and displaying the page based on the page element information and the page resource.

7. The application sharing method according to claim 6, wherein:
   the identifier comprises a first sub-identifier and a second sub-identifier, the first sub-identifier indicating the application and the second sub-identifier indicating the page.

8. The application sharing method according to claim 5, further comprising:
   providing a first-part function of the page based on the page element information and the page resource of the page; and
   obtaining an ability file from the first device; and providing a second-part function of the page based on the ability file.

9. A first device for sharing an application, the first device comprising:
- at least one processor; and
- a memory configured to store program instructions that, when run on the at least one processor, cause the first device to:
  - run an application;
  - receive a page sharing instruction including an instruction that instructs the first device to share a page in the application;
  - share a page file of the page with a second device, wherein the page file includes one or more feature availability (FA) files that can be used by a FA runtime module of the second device to convert the one or more FA files into a user interface; or
  - share an identifier corresponding to the page with a second device, wherein the identifier can be used by the second device to download a page file of the page through a network, wherein the page file includes one or more feature availability (FA) files that can be used by a FA runtime module of the second device convert the one or more FA files into a user interface.

10. The device according to claim 9, wherein running the program instructions on the at least one processor further causes the device to:
- download the application through a network; and
- back up the page file outside of the application.

11. The device according to claim 9, wherein the identifier comprises a first sub-identifier and a second sub-identifier, the first sub-identifier indicating the application and the second sub-identifier indicating the page.

12. The device according to claim 9, further comprising:
- providing a first-part function of the page based on the page element information and the page resource of the, and running the program instructions on the at least one processor further causes the device to:
- providing an ability file for the second device; and
- provide a second-part function of the page based on the ability file.

* * * * *